United States Patent
Ur et al.

(10) Patent No.: US 9,232,476 B1
(45) Date of Patent: Jan. 5, 2016

(54) TASK MANAGEMENT ACROSS LOW-POWER WIRELESS COMMUNICATIONS

(71) Applicant: EMPIRE TECHNOLOGY DEVELOPMENT LLC, Wilmington, DE (US)

(72) Inventors: Shmuel Ur, Shorashim (IL); Ariel Fligler, Hod-Hasharon (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/301,554

(22) Filed: Jun. 11, 2014

(51) Int. Cl.
*H04M 3/00* (2006.01)
*H04W 52/02* (2009.01)
*H04W 4/02* (2009.01)

(52) U.S. Cl.
CPC .......... *H04W 52/0251* (2013.01); *H04W 4/021* (2013.01); *H04W 52/0212* (2013.01)

(58) Field of Classification Search
CPC .................... H04W 52/0251; H04W 52/0212; H04W 4/021
See application file for complete search history.

(56) References Cited

U.S. PATENT DOCUMENTS

| | | | |
|---|---|---|---|
| 7,370,089 B2 | 5/2008 | Boyd et al. | |
| 7,916,676 B2 | 3/2011 | Elzur et al. | |
| 8,495,129 B2* | 7/2013 | Wolman et al. | ............... 709/201 |
| 8,700,931 B2* | 4/2014 | Gudlavenkatasiva et al. | ............... 713/320 |
| 2003/0084435 A1* | 5/2003 | Messer et al. | ............... 717/174 |
| 2005/0245245 A1* | 11/2005 | Sorvari et al. | ............... 455/418 |
| 2009/0258641 A1* | 10/2009 | Yaqub et al. | ............... 455/426.1 |
| 2009/0259865 A1* | 10/2009 | Sheynblat et al. | ............ 713/323 |
| 2009/0327150 A1* | 12/2009 | Flake et al. | ..................... 705/80 |
| 2010/0064154 A1* | 3/2010 | King | ............... 713/320 |
| 2012/0167118 A1* | 6/2012 | Pingili et al. | ................... 719/318 |
| 2012/0236717 A1 | 9/2012 | Saska et al. | |
| 2012/0275377 A1* | 11/2012 | Lehane et al. | ................ 370/328 |
| 2013/0046847 A1 | 2/2013 | Zavesky et al. | |
| 2013/0084882 A1 | 4/2013 | Khorashadi et al. | |

FOREIGN PATENT DOCUMENTS

| | | |
|---|---|---|
| CN | 1937557 A | 3/2007 |
| CN | 103491576 A | 1/2014 |
| WO | 2013043869 A1 | 3/2013 |
| WO | 2013091666 A1 | 6/2013 |

OTHER PUBLICATIONS

WIKIPEDIA, "Crowdsourcing," Internet Encyclopedia Article, 14 pages, Nov. 4, 2013.

(Continued)

*Primary Examiner* — Kenneth Lam
(74) *Attorney, Agent, or Firm* — Jensen & Puntigam, PS

(57) ABSTRACT

Technologies related to task management across low-power wireless communications are generally described. In some examples, proximal devices in range of low-power wireless communications may cooperate to allow one or more of the proximal devices to suspend task operations, while one or more of the proximal devices manage the task operations. The task operations may be associated with an energy consumption that exceeds an energy consumption associated with the low-power wireless communications, allowing the proximal devices that suspend task operations to reduce their overall energy consumption.

26 Claims, 5 Drawing Sheets

(56) References Cited

OTHER PUBLICATIONS

Dang, T., et al., "Zoom: A Multi-Resolution Tasking Framework for Crowdsourced Geo-Spatial Sensing," Article, IEEE INFOCOM pp. 496-500, 2011.

Seshasayee, B., et al., "Energy-aware Mobile Service Overlays: Cooperative Dynamic Power Management in Distributed Mobile Systems," Article, Georgia Institute of Technology, 12 pages, 2007.

* cited by examiner

TASK MANAGEMENT ACROSS LOW-POWER WIRELESS COMMUNICATIONS

BACKGROUND

Unless otherwise indicated herein, the materials described in this section are not prior art to the claims in this application and are not admitted to be prior art by inclusion in this section.

Computing devices have continued to become smaller, more powerful, less expensive, more connected, and more ubiquitous. Today, many people have a smart phone, a home computer, and an office computer. Many also have additional tablet computers and laptops. There are increasing numbers of wireless accessory devices such as wearable computers, activity monitors and medical devices. Our vehicles and our public gathering places such as coffee shops, restaurants, airports, shops and shopping malls are equipped with increasingly powerful computing devices. As a result, many of today's environments may include multiple computing devices which are capable of performing a wide variety of computing tasks and are also capable of wirelessly communicating.

Given the ubiquity of powerful computing devices, there are untapped opportunities in computing device cooperation. Today's computing devices operate mostly independently of surrounding computing devices. As a result, when viewed as a group, computing devices in most environments display significant inefficiencies and redundancies, with significant effects on group-wide energy consumption. Such energy consumption is particularly problematic when it critically impacts the ability of some devices to perform their desired functions, e.g., when devices shut down due to low battery conditions.

SUMMARY

The present disclosure generally describes technologies including devices, methods, and computer readable media relating to task management across low-power wireless communications. Some example methods may comprise suspending, by a computing device such as a mobile computing device, a task operation in response to an acceptance thereof by a proximal device in range of low-power wireless communications from the mobile computing device. Some example methods may comprise operations at the proximal device in connection with accepting and managing the task operation on behalf of the mobile computing device. Some example methods may comprise peer-to-peer cooperation of computing devices to determine which computing device will suspend a task operation and which computing device will manage performance of the task operation.

In example methods to manage tasks across low-power wireless communications comprising suspending, by a mobile computing device, a task operation in response to an acceptance of the task operation by a proximal device in range of low-power wireless communications from the mobile computing device, the mobile computing device may perform a method comprising, inter alia: identifying proximal computing devices in range of low-power wireless communications; detecting a proximal task manager at one of the proximal computing devices; sending, via low-power wireless communications with the proximal computing device, an identification of a task operation that is associated with an energy consumption that exceeds an energy consumption associated with low-power wireless communications; receiving, also via low-power wireless communications with the proximal computing device, an acceptance of the task operation; suspending the task operation in response to the acceptance of the task operation; and receiving, also via low-power wireless communications with the proximal computing device, task result information produced from performance of the task operation under management of the proximal computing device.

Example task operations which may be suspended according to the techniques described herein may comprise, inter alia, high-power wireless communications, such as communications with a cellular communications network and/or communications with a positioning system, such as Global Positioning System (GPS) communications to calculate a location of the mobile computing device. Some example task operations may comprise any relatively high energy consumption task operations, such as task operations that consume more energy relative to one or more other task operations for the mobile computing device. Some example task operations include future instances of a task operation performed repeatedly by the mobile computing device. Further example task operations may comprise task operations performed by both the mobile computing device and the at least one proximal computing device prior to the mobile computing device identifying the proximal computing device in range of low-power wireless communications.

Some example methods to manage tasks across low-power wireless communications may comprise accepting and managing, by a computing device, task operations identified by a proximal mobile computing device, e.g., a mobile computing device that suspends a task operation as described herein. For example, the computing device may perform a method comprising identifying, to proximal computing devices via low-power wireless communications, an available task manager at the computing device, wherein the available task manager is adapted to manage performance of task operations on behalf of the proximal computing devices; receiving, via low-power wireless communications with a proximal mobile computing device, an identification of a task operation that is associated with an energy consumption that exceeds an energy consumption associated with the low-power wireless communications; sending, also via low-power wireless communications with the proximal mobile computing device, an acceptance of the task operation; managing performance of the task operation; and sending, also via low-power wireless communications with the proximal mobile computing device, task result information produced from performance of the task operation under management of the computing device.

In some embodiments, example methods comprising accepting and managing task operations may include accepting and managing task operations on behalf of multiple proximal computing devices. For example, methods may include: receiving task management information from multiple proximal computing devices in range of low-power wireless communications from the computing device, the task management information comprising task acceptance criteria, identifications of task operations, and power supply information for each of the multiple proximal computing devices; allocating task operations for the multiple proximal computing devices among the multiple proximal computing devices, wherein said allocating may reduce redundant task operations of the multiple proximal computing devices; and coordinating distribution of task result information among the multiple proximal computing devices.

Some example methods may comprise peer-to-peer cooperation of computing devices to determine which computing devices will suspend a task operation and which computing devices will manage performance of the task operation. For example, proximal computing devices may exchange, via low-power wireless communications, task management information comprising task acceptance criteria, identifications of task operations, and power supply information. The proximal computing devices may determine which proximal computing device power supply has less available power, and the proximal computing devices may match task operation identifications with task acceptance criteria. The proximal computing devices may establish roles as client and/or server computing devices with respect to one another in response to determinations regarding relative power supply and matching task operation identifications and task acceptance criteria. In a client role, a computing device may suspend a task operation. In a server role, a computing device may accept and manage a task operation. In some embodiments, the proximal computing devices may switch roles, e.g., from a role as client to a role as server, and vice-versa.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and a task manager configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
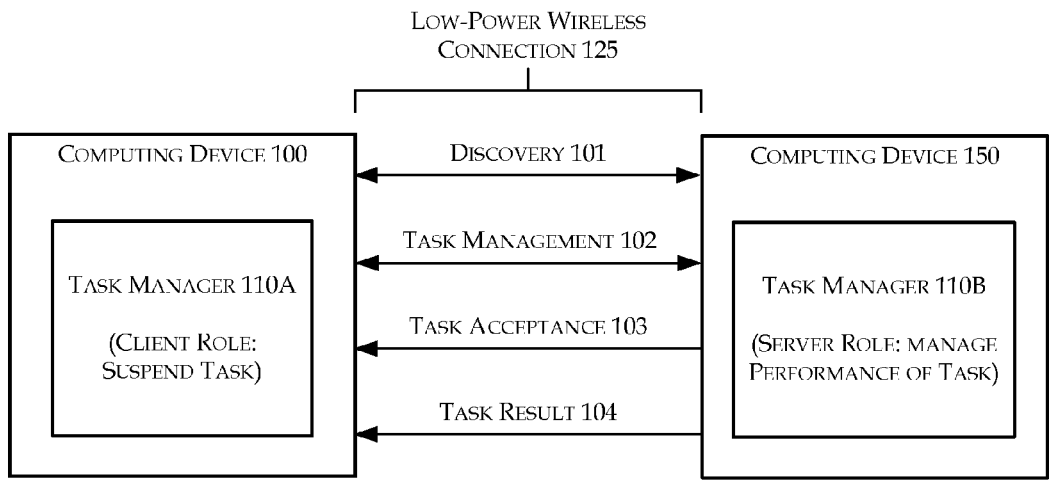
FIG. 1 is a block diagram illustrating task management across an example low-power wireless connection between computing devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to task management across low-power wireless communications. In some examples, proximal computing devices in range of low-power wireless communications may cooperate to allow one or more of the proximal computing devices to suspend task operations, while one or more of the proximal computing devices manage the task operations. The task operations may be associated with an energy consumption that exceeds an energy consumption associated with the low-power wireless communications, allowing the proximal computing devices that suspend task operations to reduce their overall energy consumption.

Technologies described herein may be deployed in a variety of scenarios. In general, given the proliferation of computing devices, and given that similar task operations may often be performed by many computing devices, computing devices may employ low-power wireless communications to reduce load by sharing task operations, thereby saving energy and increasing battery life.

In some example scenarios, computing devices may use a device-to-device protocol. A computing device may temporarily offload a task operation to a proximal device, while the computing device is in sufficient proximity to the proximal device to be within range of low-power wireless communications. For example, a computing device may be adapted to detect proximal devices to which to temporarily transfer task operations. When an available proximal device is detected, the computing device may temporarily transfer a task operation to the proximal device. The computing device may temporarily suspend local execution of the task operation while the task operation is being managed by the proximal device. The computing device may wirelessly communicate with the proximal device regarding the proximal device's management of the task operation. The computing device may eventually terminate the proximal device's management of the task operation and re-assume local execution of the task operation, e.g., when the computing device moves out of range of low-power wireless communications from the proximal device.

In a cellular telephone example, a cellular telephone X may be low on power. As a result, contacting a cellular communications network every time cellular telephone X wakes up may be expensive in terms of power consumption. A proximal cellular telephone, cellular telephone Y, may be in range of low-power wireless communications from cellular telephone X. Cellular telephone X, with the agreement of cellular telephone Y and the cellular communications network, may temporarily authorize cellular telephone Y to communicate with the cellular communications network on behalf of cellular telephone X. Cellular telephone X may temporarily thereafter contact cellular telephone Y via low-power wireless communications, instead of contacting the cellular communications network, thereby expending less energy by cellular telephone X. The cellular communications network may contact cellular telephone Y to instruct cellular telephone Y to notify cellular telephone X of incoming communications for cellular telephone X.

In a GPS example, it is not uncommon that a single person may have multiple computing devices that conduct GPS communications and calculate GPS location. Similarly, a person carrying a computing device that conducts GPS communications and calculates GPS location may be in proximity to one or more other people carrying one or more other computing devices that also conduct GPS communications and calculate GPS location, such as people gathered in a car, bus, airplane, train, office, restaurant, store, home or other gathering place. GPS communications and location calculation can be power intensive. In some embodiments, one or more computing devices may conduct GPS communications and calculate GPS location, and those computing devices may inform one or more proximal devices of the results via low-power wireless communications as described herein. The proximal devices may temporarily suspend GPS communications and location calculation and the proximal devices may thereby expend less energy and extend battery life.

In a wireless accessory example, a computing device user may have a wireless accessory device, such as an activity tracker device sold under the brands FITBIT®, JAWBONE®, GARMIN®, NIKE®, or otherwise. The wireless accessory device may be adapted to wirelessly communicate with the computing device user's mobile telephone. The mobile telephone may be adapted, e.g., through an activity tracker application, to perform some activity tracking functions, and the activity tracking functions of the mobile telephone may overlap with activity tracking functions of the wireless accessory device. The wireless accessory device and the mobile telephone may be adapted to detect when they are in range of low-power wireless communications, i.e., when the wireless accessory device is in range of low-power wireless communications from the mobile telephone, and the wireless accessory device and the mobile telephone may be adapted to assign overlapping activity tracking functions to the wireless accessory device or to the mobile telephone, as described herein. Overlapping activity tracking functions may be assigned according to quality and/or power supply considerations, thereby saving power and/or increasing quality.

In some example scenarios, devices may use an ad-hoc network approach in which local optimization is performed to reduce load at multiple proximal devices. An ad-hoc network of proximal devices may be adapted to poll participating devices for task management information including task operations at the participating devices, device resources such as power supply at the participating devices, and/or task acceptance criteria at the participating devices. The resulting collected task management information may identify task operations for the participating devices, and the task management information may furthermore identify which computing devices have adequate resources and task acceptance criteria to perform the identified task operations. The network may use the task management information to establish a temporary policy whereby selected computing devices in the network are assigned management of identified task operations on behalf of other computing devices in the network. The temporary policy may be adaptively modified to accommodate different computing devices, as computing devices move in and out of the network. In some scenarios, a dedicated computing device, such as a computing device connected to wall power as may be provided in a home, coffee shop, office, vehicle, or other gathering place, may be equipped to support the ad-hoc network, e.g., by polling participating devices for task management information and establishing a temporary policy for the network, as well as optionally managing task operations on behalf of mobile devices that may temporarily enter the network.

In a coffee shop example, a computing device C in a coffee shop may be adapted to help customers save energy on their computing devices. Computing device C may poll proximal devices in range of low-power wireless communications for identifications of task operations. Computing device C may manage reported task operations, on behalf of the proximal devices, for which computing device C has sufficient resources and as permitted by computing device C's task acceptance criteria. Computing device C may optionally poll the proximal devices for device resources and task acceptance criteria, and computing device C may assign one or more proximal devices to manage task operations, e.g., by assigning proximal devices to perform the task operations and broadcast results to the other proximal devices.

In a playground example, children may carry computing devices equipped with an activity tracking function adapted to monitor a child and call the parents when there may be a concern. Such computing devices may monitor a child's vitals, location, accelerometer information, and may listen for swears and threats, etc. The playground may also be equipped with one or more monitoring devices such as cameras, impact devices, thermometers, etc. The children's computing devices may cooperate with the playground monitoring devices to manage task operations. Task operations such as monitoring vitals may remain at each child's computing device, while listening and looking at the interactions can be managed by one or more of the children's computing devices and/or the playground monitoring devices, while being suspended by some of the children's computing devices, e.g., to preserve battery life.

In a bus ride example, bus riders may have mobile computing devices in range of low-power wireless communications. The mobile computing devices may communicate to identify shared task operations, mobile computing devices capable of performing the shared task operations, and mobile computing device power supply information. The mobile computing devices may assign shared task operations to selected mobile computing devices having sufficient capabilities and power supply. The selected mobile computing devices may thereafter perform the shared task operations. The selected mobile computing devices may report task results to other mobile computing devices on the bus via low-power wireless communications. Meanwhile, the other mobile computing devices may temporarily suspend local performance of the shared task operations and thereby save energy. The shared task operations may be adaptively re-assigned to subsequently selected mobile computing devices as relative power supply of the mobile computing devices changes. In some embodiments, the mobile computing devices may make micro-payments or credit exchanges to compensate selected mobile computing devices for their performance of shared task operations.

FIG. 1 is a block diagram illustrating task management across an example low-power wireless connection between computing devices, arranged in accordance with at least some embodiments of the present disclosure. As illustrated in FIG. 1, a computing device 100 and a computing device 150 are connected by a low-power wireless connection 125. Computing devices 100 and 150 may comprise any types of computing devices, including but not limited to mobile telephones, laptops, desktops, tablets, smart watches or other wireless accessory devices.

Low-power wireless connection 125 may comprise any low-power wireless connection. A "low-power wireless connection" as used herein includes Wi-Fi connections conforming to any of the various IEEE 802.11 standards, Bluetooth connections conforming to any of the various Bluetooth standards, and any other wireless connections which may generally have sufficient power to support real-world communication ranges of about 200 meters or less. The term "proximal" as used herein, e.g., in describing proximal computing devices, refers to any distance that is within range of a low-power wireless connection. Thus, depending on the type of low-power wireless connection involved and local topography, proximal devices may be separated by up to about 200 meters or less. Low-power wireless connection 125 may comprise a temporary connection, e.g., a connection lasting so long as computing devices 100 and 150 remain proximal, understanding that either or both of computing devices 100 and 150 may be a mobile computing device which may therefore move out of range of low-power wireless connection 125.

In contrast to low-power wireless connections, "high power wireless connections" as used herein includes wireless connections which may generally have sufficient power to support real-world communication ranges of about 1 kilometer or more. High power wireless connections may employ, e.g., technologies generally used for Wireless Wide Area Networks (WWANs), such as mobile telecommunication cellular network technologies including Long-Term Evolution (LTE), WiMAX, Universal Mobile Telecommunications System (UMTS), Code Division Multiple Access (CDMA), Global System for Mobile Communications (GSM), Cellular Digital Packet Data (CDPD), and Mobitex technologies. High power wireless connections may employ, e.g., satellite and/or ground tower communications with a positioning system, such as GPS, to calculate a location of a mobile computing device.

Computing device 100 comprises a task manager 110A and computing device 150 comprises a task manager 110B. Depending on circumstances, task managers 110A and 110B may be adapted to operate in a client role and/or a server role. In FIG. 1, task manager 110A is shown in a client role in which task operations may be suspended at computing device 100, and task manager 110B is shown in a server role in which computing device 150 may manage performance of the task operations suspended at computing device 100.

As illustrated in FIG. 1, task managers 110A and 110B may be adapted to cause computing devices 100 and 150 to engage in communications comprising a discovery 101, a task management 102, a task acceptance 103, and a task result 104. Discovery 101 may comprise communications to detect proximal computing devices with which low-power wireless connection 125 may be established. Discovery 101 may also comprise communications to detect whether any detected proximal computing devices are equipped with task managers and are therefore able to cooperate to manage task operations over low-power wireless connection 125.

Computing devices 100 and 150 may be adapted to engage in task management 102 with any proximal device(s) comprising task managers, as may be identified during discovery 101. Computing devices 100 and 150 illustrated in FIG. 1 each comprise a task manager, and therefore computing devices 100 and 150 may proceed from discovery 101 to task management 102. Task management 102 may comprise, inter alia, exchanging identifications of task operations. Either or both of computing devices 100 and 150 may send identifications of task operations to the other computing device.

Identifications of task operations may comprise identifications of tasks or portions of tasks which a computing device may suspend locally while the identified task operations are managed remotely at a proximal computing device. When a task operation includes a portion of a task, the computing device that suspends the task operation may be adapted to suspend the task operation, while performing remaining portions of the task, as appropriate to complete the task, locally at the computing device. A variety of example task operations are disclosed herein, including, e.g., communications with cellular communications networks and GPS communications. However, it will be appreciated with the benefit of this disclosure that task operations beyond those identified herein may also be managed using the techniques described herein, and so this disclosure is not limited to any particular task operations.

In some embodiments, computing devices 100 and 150 may be adapted to identify task operations which are associated with an energy consumption that exceeds an energy consumption associated with communications via low-power wireless connection 125. For example, in some embodiments, task operations may be tested to determine local energy consumption and management energy consumption. Local energy consumption may comprise, e.g. energy consumption associated with each tested task operation when the task operation is performed locally at a computing device such as computing device 100. Management energy consumption may comprise, e.g., energy consumption at the computing device associated with each tested task operation when the task operation is managed remotely, e.g., energy consumption at computing device 100 when the task operation is managed via low-power wireless connection 125 with computing device 150. The management energy consumption test may for example determine computing device 100 energy consumption in conducting discovery 101, task management 102, task acceptance 103, and task result 104 communications, and related operations, in connection with suspending a tested task operation while the tested task operation is managed at another computing device, such as computing device 150. In some embodiments, task managers 110A and 110B may be configured to identify task operations which are identified in advance through such testing as having higher energy consumption when performed locally and/or lower energy consumption when managed across low-power wireless connection 125. Other embodiments may, e.g., dynamically measure local energy consumption and/or management energy consumption for task operations, and may compare the dynamically measured energy consumptions to identify task operations which are associated with local energy consumption that exceeds management energy consumption associated with communications via low-power wireless connection 125.

In an example according to FIG. 1, computing device 100 may be adapted to send identified task operations to computing device 150 during task management 102. Computing device 100 may be adapted to additionally send any further information, such as task setup and task reporting information, which may be used at computing device 150 to perform the identified task operations and to report results thereof back to computing device 100, e.g., as task result 104.

Computing device 150 may be adapted to receive the identified task operations from computing device 100, and computing device 150 may be adapted to determine whether computing device 150 is available to manage performance of the identified task operations. For example, in some embodiments computing device 150 may determine whether computing device 150 has adequate device resources to perform of the identified task operations. In some embodiments, computing device 150 may determine whether the identified task operations meet any task acceptance criteria established at computing device 150. In some embodiments, computing device 150 may determine whether other proximal devices are available to perform of the identified task operations, e.g., as described further with reference to FIG. 2.

When computing device 150 is available to manage performance of the identified task operations, computing device 150 may be adapted to send task acceptance 103 to computing device 100. Task acceptance 103 may comprise an acceptance of a task operation identified in task management information 102. When the task operation is accepted, computing device 150 may be adapted to subsequently manage performance of the accepted task operation, while computing device 100 may be adapted to subsequently suspend the accepted task operation.

In some embodiments, computing device 150 may be adapted to send any information as may result from performance of the accepted task operation to computing device 100 as task result 104. Computing device 100 may be adapted to receive and use task result 104, in similar fashion to computing device 100's use of any task results produced locally at computing device 100 when the accepted task operation is otherwise performed locally at computing device 100.

In some embodiments, computing device 150 may be adapted to conduct task-related user signaling, either in addition to, or instead of sending task result 104 to computing device 100. For example, when an accepted task operation comprises an alarm, the accepted task operation may comprise making an audible ringtone as well as activating an alarm display. The audible ringtone and alarm display may be produced at either or both of computing device 150 and/or computing device 100, depending on desired configuration. For embodiments that conduct task-related user signaling at computing device 100, task result 104 may comprise a notification for computing device 100 to engage task-related user signaling. For embodiments that conduct task-related user signaling at computing device 150, computing device 100 may be adapted to display, in response to task acceptance 103, a user notification that task-related user signaling will be suspended at computing device 100 and instead performed at proximal computing device 150. Such configurations may allow for further power savings at computing device 100.

In some embodiments, task management information 102 may comprise information that enables computing devices 100 and 150 to adaptively determine which computing device will assume the client role, and which computing device will assume the server role. For example, task management information 102 may comprise task acceptance criteria and/or device resource information. Computing devices 100 and 150 may be adapted to determine, from exchanged task acceptance criteria and/or device resource information, whether to enter a client or a server role.

Task acceptance criteria exchanged by computing devices 100 and 150 may comprise, e.g., identifications of tasks which one or more of computing devices 100 and 150 are permitted to accept and manage on behalf of proximal computing devices. For example, computing device 150 may send, to computing device 100, task acceptance criteria identifying GPS tasks and/or any other tasks which computing device 150 may be permitted to manage. When computing device 150 provides task acceptance criteria in exchanged task management information 102, computing device 100 may be adapted to use the received task acceptance criteria to identify task operations for management by computing device 150. Computing device 100 may thus identify task operations for which computing device 100 may assume a client role and for which computing device 150 may assume a server role.

Device resource information exchanged by computing devices 100 and 150 may comprise, e.g., power supply information, CPU type, and/or device capabilities. For example, computing device 100 may be adapted to send, to computing device 150, power supply information indicating low battery at computing device 100. Computing device 150 may be adapted to send, to computing device 100, power supply information indicating that computing device 150 is connected to an external source of power, such as a wall outlet, or indicating that computing device 150 has ample remaining battery power. Computing devices 100 and 150 may be adapted to determine from exchanged device resource information whether to enter a client or a server role. For example, computing devices 100 and 150 may determine that computing device 150 has greater available power supply and is also capable of performing GPS tasks, and therefore computing devices 100 and 150 may determine that computing device 150 may enter a server role in which computing device 150 may manage performance of GPS tasks on behalf of computing device 100.

Computing devices 100 and 150 may optionally be adapted to perform any of a variety of additional operations in connection with some embodiments of this disclosure. For example, in some embodiments, a computing device in a server role, such as computing device 150, may be adapted to distribute task operations to one or more other devices, e.g., as described with reference to FIG. 2. In some embodiments, computing devices 100 and 150 may be adapted to communicate with additional devices, e.g., as described with reference to FIG. 3, to manage task operations across low-power wireless communications among a "crowd" of computing devices.

In some embodiments, computing devices 100 and 150 may be adapted to switch their respective client and server roles. For example, computing device 100 may switch from the client role, as illustrated in FIG. 1, to instead assume the server role. Computing device 150 may switch from the server role, as illustrated in FIG. 1, to instead assume the client role. Computing devices 100 and 150 may be configured to switch roles under any of a variety of conditions. In some embodiments, computing devices 100 and 150 may be configured to dynamically switch roles in response to a change in their respective power supply information. For example, computing device 100 and/or computing device 150 may be connected to, or disconnected from, wall power. Computing devices 100 and 150 may be configured to switch roles so that the computing device that is either connected to an external source of power, or has greater battery power, is in the server role, while the computing device that is not connected to an external source of power or has lesser battery power is in the client role.

In some embodiments, computing devices 100 and 150 may be configured to dynamically switch roles according to a fairness algorithm, such as an algorithm that assigns each device to a server role for a period of time, and then triggers a role switch. For example, computing devices 100 and 150 may be adapted to periodically re-assign client and server roles, so that each of computing devices 100 and 150 may spend similar periods in each of the client and server roles. As a result, both computing devices 100 and 150 may experience a net energy savings in some embodiments, e.g., when computing devices 100 and 150 are each able to periodically suspend a redundant task while the task is managed by the other computing device.

In some embodiments, computing devices 100 and 150 may be configured to simultaneously assume both client and server roles. For example, computing device 100 may assume a client role for a first task while simultaneously assuming a server role for a second task, while computing device 150 may assume a server role for the first task while simultaneously assuming a client role for the second task. Thus for example, both computing devices 100 and 150 may initially perform GPS communications and GPS location processing independently. Computing devices 100 and 150 may interact according to FIG. 1 to allocate GPS communications to computing device 150. Computing devices 100 and 150 may simultaneously enter opposite client/server roles to allocate GPS location processing to computing device 100. Each of computing devices 100 and 150 may accept its task operation and may report task result information to the other. Computing devices 100 and 150 may thereby eliminate redundant task operations, reduce overall power consumption, and distribute task operations among participating computing devices 100 and 150.

In some embodiments, computing devices 100 and 150 may be configured to perform the operations illustrated in FIG. 1 responsive to a detected low energy state. For example, computing devices 100 and 150 may be adapted to operate normally, without task management according to FIG. 1, until a computing device, e.g., computing device 100, detects a low energy state. Computing device 100 may for example detect that its battery is at or below a predetermined threshold power level, such as 50%, 49%, 48% . . . 1%. Computing device 100 may be configured to send a request to computing device 150 to manage one or more tasks on behalf of computing device 100 in response to detection of such a predetermined threshold power level. Computing devices 100 and 150 may engage in task management according to this disclosure responsive to the request from computing device 100.

In some embodiments, computing devices 100 and 150 may be configured to exchange electronic credits. For example, a computing device in a client role, such as computing device 100, may send an electronic credit to a computing device in a server role, such as computing device 150, to compensate computing device 150 for managing performance of a task operation on behalf of computing device 100. Example electronic credits may comprise any of the various crypto currencies, such as Bitcoin. Other example electronic credits may comprise credits certified by a power credit authority which may be exchanged between devices as well as optionally bought and sold from the power credit authority. In some embodiments, devices may be adapted to dynamically negotiate electronic credit compensation rates in inverse proportion to their available power supplies. For example, when computing devices 150 has limited power supply, computing device 150 may be adapted to accept higher electronic credit compensation rates, and when computing device 150 is connected an external source of power or otherwise has abundant power supply, such as over 50% battery life, computing device 150 may be adapted to accept lower electronic credit compensation rates.

In some embodiments, computing devices 100 and 150 may be configured to detect stability of low-power wireless connection 125, and to limit task management across low-power wireless connection 125 to situations wherein low-power wireless connection 125 is semi-stable. For example, when both of computing devices 100 and 150 are mobile computing devices carried by persons walking by each other on a busy street, computing devices 100 and 150 may not be proximal for sufficient time to achieve meaningful benefits from task management across of low-power wireless connection 125. Conversely, when computing devices 100 and 150 are mobile computing devices carried by persons sitting at a restaurant or in a car or bus, computing devices 100 and 150 may be proximal for sufficient time to achieve meaningful benefits from task management across of low-power wireless connection 125.

Computing devices 100 and 150 may be configured to detect a semi-stable relationship indicator, indicating a semi-stable relationship between computing devices 100 and 150, prior to performing task management 102. Example semi-stable relationship indicators include signal strength information indicating stable, unchanging signal strength associated with low-power wireless connection 125, and accelerometer information indicating that persons carrying computing devices 100 and 150 are sitting.

In some embodiments, computing devices 100 and 150 may be configured to detect a session termination indicator, indicating termination of a semi-stable relationship between computing devices 100 and 150. For example, when a person carrying either of computing devices 100 and 150 stands and walks, after a period of sitting, it is likely that the person may walk out of range of low-power wireless connection 125. Example session termination indicators include signal strength information indicating changing signal strength associated with low-power wireless connection 125, accelerometer information indicating that persons carrying computing devices 100 and 150 are walking, and power supply information indicating that either of computing devices 100 and 150 is critically low on power such that it will be automatically powered off. In response to detecting a session termination indicator, either or both of computing devices 100 and 150 may be configured to send a session termination notice to the other, computing device 150 may be configured to send any final task result information as task result 104, and computing device 100 may be configured to re-initiate local performance of suspended task operations.

In some embodiments, computing devices 100 and 150 may be configured to enable user control over task operations which may be managed across low-power wireless connection 125. For example, computing devices 100 and 150 may be configured to display a task management User Interface (UI) adapted to receive task management user inputs. Example task management user inputs may comprise user selections of task operations which may be automatically identified by computing devices 100 and 150 during task management 102; user selections of task acceptance criteria defining task operations which computing devices 100 and 150 may accept for management; and/or real-time user permissions to allow computing devices 100 and 150 to identify or accept task operations for management across low-power wireless connection 125.

Task operations which may be managed according to this disclosure may include, inter alia, high-power wireless communications with a cellular communications network, such as in the cellular telephone example described herein. Revisiting the cellular telephone example in the context of FIG. 1, cellular telephone X may comprise computing device 100 and cellular telephone Y may comprise computing device 150. Computing devices 100 and 150 may perform discovery 101 and task management 102, and computing devices 100 and 150 may thereby determine that computing device 150 is available to monitor the cellular communications network on behalf of computing device 100.

Subsequent to discovery 101 and task management 102, computing device 100 may be configured to send a high-power wireless communication to a remote computing device, e.g., a cellular communications network base station, to enable the remote computing device to interact with computing device 150. Computing device 100 may for example send, to the cellular communications network base station, an authorization along with an Internet Protocol (IP) address for computing device 150. The cellular communications network base station may be configured to thereafter provide communications for computing device 100 instead to computing device 150. Computing device 100 may be configured to thereafter suspend its task operations involving using high-power wireless communications to monitor the cellular communications network for incoming communications. Computing device 100 may instead perform such monitoring by communicating with computing device 150 via low-power wireless connection 125, while computing device 150 manages monitoring the cellular communications network for incoming communications on behalf of computing device 100. Computing device 150 may provide responses to monitoring requests from computing device 100, e.g., as task result 104.

In some embodiments, computing devices 100 and 150 may be configured to select any relatively high energy consumption task operations, relative to other task operations for the respective computing devices 100 and 150, for management across low-power wireless connection 125. For example, computing devices 100 and 150 may be adapted to dynamically measure energy consumption of task operations, and computing devices 100 and 150 may for example dynamically rank task operations by dynamically measured energy consumption. In some embodiments, computing devices 100 and 150 may each comprise a list of task operations which may be managed according to this disclosure, where the listed task operations may be ranked by energy consumption. Energy consumption for various task operations may for example be tested and task managers 110A and 110B may comprise lists of task operations ranked by energy consumption as tested. Computing devices 100 and 150 may be configured to select, from the list, task operations having relatively high and/or highest energy consumption for management according to the techniques described herein.

In some embodiments, computing devices 100 and 150 may be configured to manage, across low-power wireless connection 125, future instances of task operations performed repeatedly by computing device 100 and/or computing device 150. Task operations performed repeatedly include, e.g., "monitoring" task operations in which a computing device may repeatedly check for some condition, and take action when the condition occurs. A computing device engaged in monitoring may sleep for a time, wake up, check for some condition, if the condition occurs take action, if not go back to sleep. For example, a cellular telephone may wake up and check whether there is an incoming phone call, go to back to sleep, repeat. A computing device equipped with GPS may wake up and check GPS location, go to back to sleep, repeat. In some embodiments, computing device 100 may suspend future monitoring, for so long as computing device 100 is connected to computing device 150 via low-power wireless connection 125, and computing device 150 may manage computing device 100's monitoring. If a monitored condition occurs, computing device 150 may notify computing device 100, e.g., via task result 104, and computing device 100 may take action as appropriate in response to occurrence of the monitored condition.

In some embodiments, computing devices 100 and 150 may be configured to manage, across low-power wireless connection 125, task operations which are performed by both computing devices 100 and 150 prior to discovery 101. For example, computing devices 100 and 150 may compare identifications of task operations exchanged during task management 102, to identify task operations which are performed by both computing devices 100 and 150. Task operations which are performed by both computing devices 100 and 150 may be referred to herein as redundant task operations. Each redundant task operation may be suspended by computing device 100 or 150, while the other computing device 100 or 150 manages the redundant task operation. For example, when both computing devices 100 and 150 identify GPS as a task operation during task management 102, computing device 150 may accept the GPS task operation at task acceptance 103, computing device 100 may suspend the GPS task operation, and computing device 150 may thereafter report GPS location information to computing device 100 as task result 104, for so long as low-power wireless connection 125 is in place. By managing redundant task operations across low-power wireless connection 125, computing devices 100 and 150 may collectively consume less energy as a result of task management.

Figure 2:
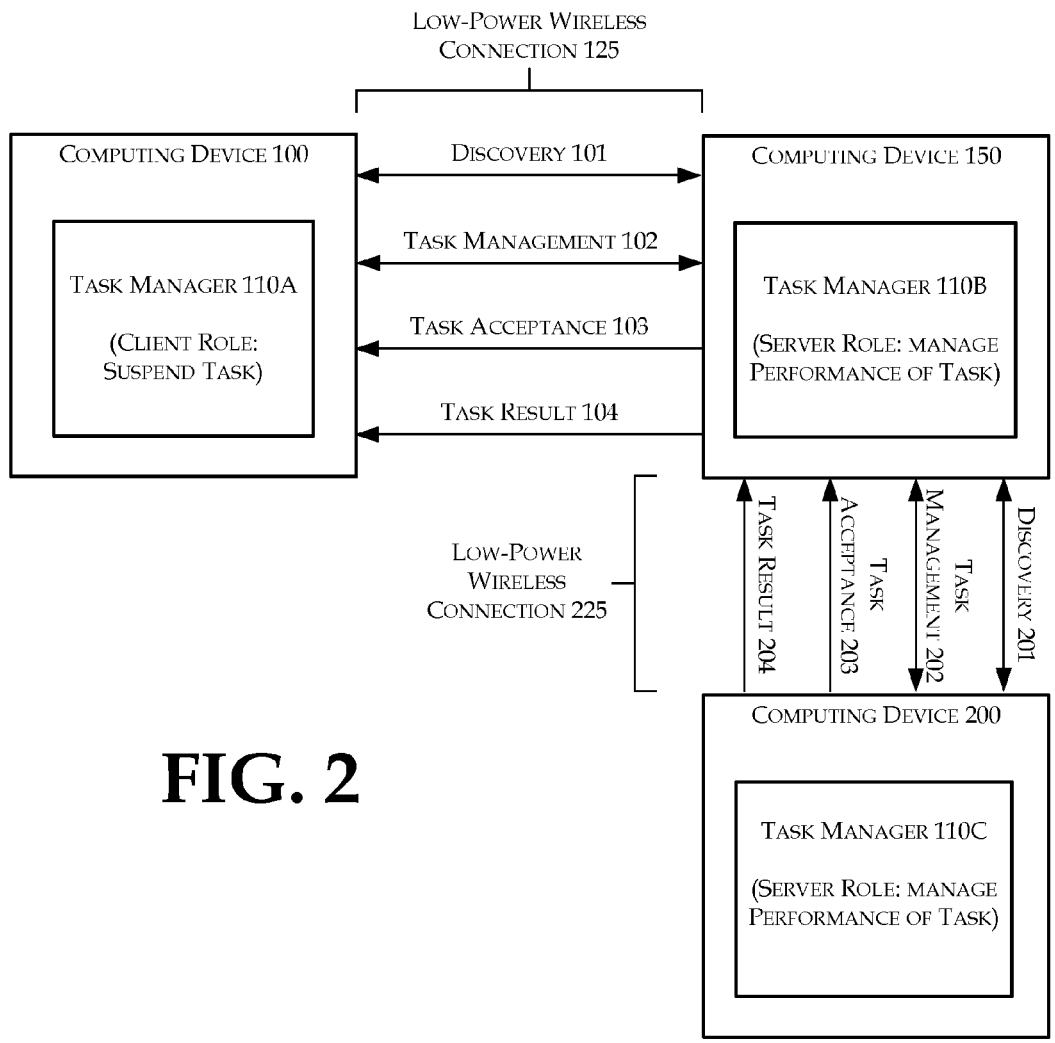
FIG. 2 is a block diagram illustrating task management across multiple low-power wireless connections between computing devices.

FIG. 2 is a block diagram illustrating task management across multiple low-power wireless connections between computing devices, arranged in accordance with at least some embodiments of the present disclosure. FIG. 2 comprises the elements of FIG. 1, including computing devices 100 and 150 and task managers 110A and 110B, low-power wireless connection 125, and discovery 101, task management 102, task acceptance 103 and task result 104. FIG. 2 further comprises a computing device 200 comprising a task manager 110C, and a low-power wireless connection 225 between computing device 200 and computing device 150. A discovery 201, a task management 202, a task acceptance 203 and a task result 204 are illustrated as communications between computing device 200 and computing device 150 via low-power wireless connection 225.

As illustrated in FIG. 2, task managers may adapt computing devices to manage performance of task operations locally and/or by relaying task operations to other devices. For example, computing device 150 comprising task manager 110B may be adapted to manage performance of a task operation identified by computing device 100 locally at computing device 150, or by relaying the identified task operation to computing device 200. To relay the identified task operation to computing device 200, computing device 150 may be adapted to interact with computing device 200 via discovery 201, task management 202, task acceptance 203 and task result 204, wherein each of operations 201, 202, 203 and 204 may be generally similar to the corresponding operations described in connection with FIG. 1.

In some embodiments, task management 202 may comprise sending, by computing device 150, identifications of task operations received from computing device 100 to computing device 200. When an identified task operation is accepted by computing device 200, computing device 200 may send task acceptance 203 to computing device 150. Computing device 150 may receive task acceptance 203 and computing device 150 may subsequently send task acceptance 103 to computing device 100. Computing device 100 may suspend the accepted task operation while computing device 200 performs the accepted task operation.

Depending on the accepted task operation, computing device 200 may generate task results in the course of performing the accepted task operation. Computing device 200 may send any such results as task result 204 to computing device 150. Computing device 150 may be adapted to receive task result 204 and to subsequently include result 204 with task result 104.

In embodiments wherein task management communications 102 and 202 comprise exchanges of task acceptance criteria and/or device resource information, as described herein in connection with FIG. 1, computing device 150 may be adapted to aggregate identifications of task operations, task acceptance criteria, and/or device resource information, and computing device 150 may be adapted to determine, based on the aggregated information, computing devices among computing devices 100, 150, 200 to which to assign identified task operations. Computing device 150 may furthermore be adapted to initiate role switches, e.g., from client roles to server roles and vice versa, among computing devices 100, 150, 200 for any of the assigned task operations. Alternatively, computing device 150 may relay identifications of task operations, task acceptance criteria, and/or device resource information among computing devices 100, 150, and 200, and each of computing devices 100, 150, and 200 may make its own determinations regarding acceptance of task operations and/or role switches.

FIG. 2 illustrates three computing devices for simplicity of explanation, however, it should be understood that embodiments according to FIG. 2 may be extended to any number of computing devices. Thus for example, any number of computing devices in client roles may suspend task operations while the task operations are managed by any number of computing devices in server roles. Any of the devices in server roles may manage task operations by performing the task operations locally, or by relaying them to other devices in server roles, as illustrated in FIG. 2. Furthermore, any number of devices may simultaneously take both client and server roles with respect to different task operations, as described herein.

Figure 3:
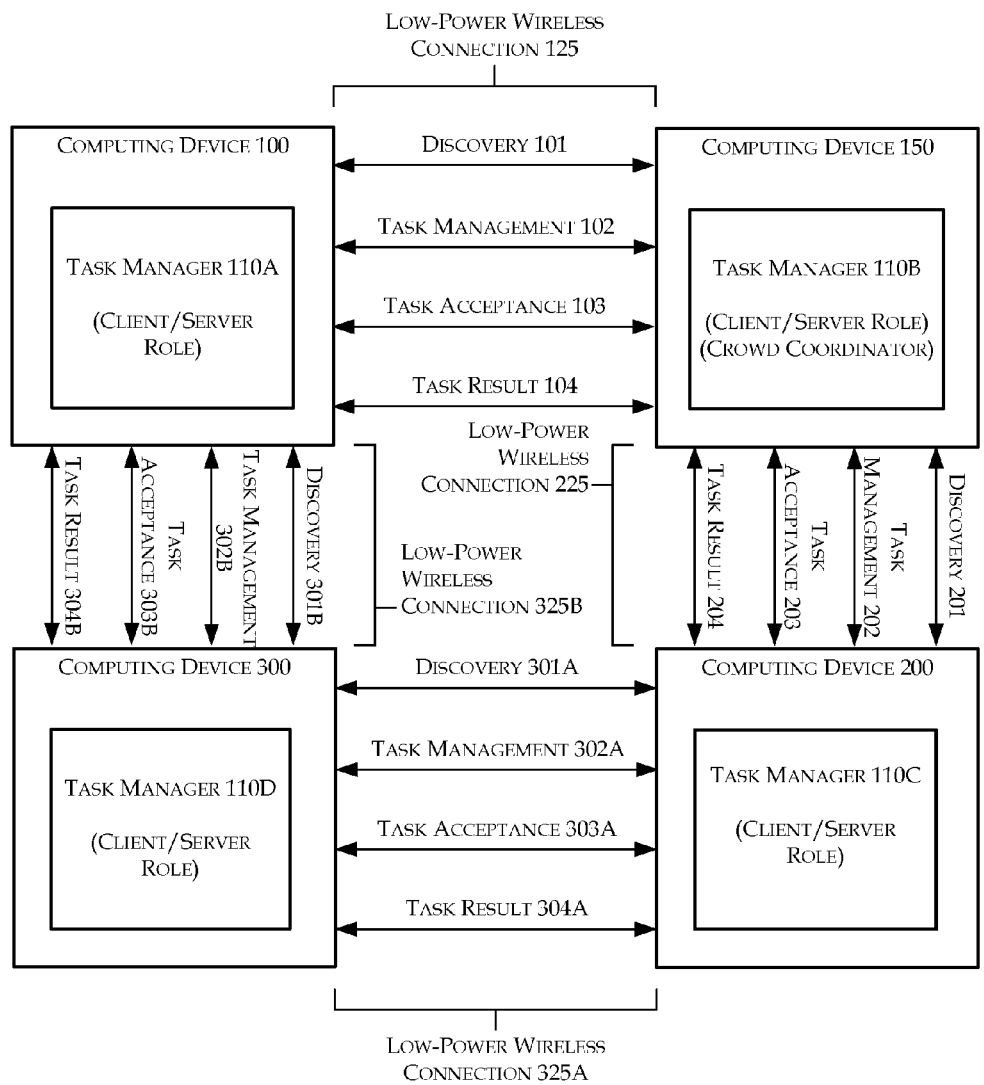
FIG. 3 is a block diagram illustrating task management across low-power wireless connections among a "crowd" of computing devices.

FIG. 3 is a block diagram illustrating task management across low-power wireless connections among a "crowd" of computing devices, arranged in accordance with at least some embodiments of the present disclosure. FIG. 3 comprises the elements of FIG. 1 and FIG. 2, including computing devices 100, 150, and 200, task managers 110A, 110B, and 110C, low-power wireless connections 125 and 225, discovery 101 and 201, task management 102 and 202, task acceptance 103 and 203, and task result 104 and 204. FIG. 3 further comprises a computing device 300 comprising a task manager 110D, a low-power wireless connection 325A between computing device 300 and computing device 200, and a low-power wireless connection 325B between computing device 300 and computing device 100. A discovery 301A, a task management 302A, a task acceptance 303A, and a task result 304A are illustrated as communications between computing device 300 and computing device 200 via low-power wireless connection 325A. A discovery 301B, a task management 302B, a task acceptance 303B, and a task result 304B are illustrated as communications between computing device 300 and computing device 100 via low-power wireless connection 325B.

In some embodiments according to FIG. 3, task managers 110A, 110B, 110C, and 110D may adapt computing devices 100, 150, 200 and 300 to manage performance of task operations among the crowd of participating computing devices 100, 150, 200 and 300 so as to reduce redundant task operations. By reducing redundant task operations for those task operations having energy consumption exceeding energy consumption of communications via low-power wireless connections 125, 225, 325A and 325B, the crowd of participating computing devices 100, 150, 200 and 300 may decrease its overall energy consumption.

In some embodiments, the crowd of participating computing devices 100, 150, 200 and 300 may decrease overall energy consumption, over time, of each of participating computing devices 100, 150, 200 and 300, e.g., by occasionally re-assigning management of task operations among participating computing devices 100, 150, 200 and 300, using a round-robin type protocol or other fairness-based sharing protocol. In some embodiments, the crowd of participating computing devices 100, 150, 200 and 300 may decrease its overall energy consumption, however the decrease in energy consumption may not be distributed fairly among participating computing devices 100, 150, 200 and 300. For example, the energy consumption of one or more of participating computing devices 100, 150, 200 and 300, such as computing device 150, may increase due to computing device 150's management of task operations on behalf of other computing devices 100, 200, and 300. Computing devices 100, 150, 200 and 300 may be configured to adaptively select computing devices, e.g., computing device 150, to manage task operations for the crowd of participating computing devices 100, 150, 200 and 300 based on power supply information, e.g., computing device 150 may be connected to an external source of power while other computing devices 100, 200, and 300 may be on battery power.

Any of the techniques described in connection with FIG. 1 and FIG. 2 may be applied in embodiments according to FIG. 3. In FIG. 3, each of computing devices 100, 150, 200 and 300 is shown in a client/server role, and task acceptances 103, 203, 303A and 303B, as well as task results 104, 204, 304A and 304B, are illustrated with two-way arrows to indicate that each of computing devices 100, 150, 200 and 300 may accept and manage performance of task operations on behalf of the other participating computing devices.

In some embodiments, computing devices 100, 150, 200 and 300 may be configured to coordinate distribution of task operations among computing devices 100, 150, 200 and 300 by appointing a crowd coordinator, e.g., computing device 150 may be appointed as crowd coordinator. The crowd coordinator may be configured to track participating devices as devices enter and leave the crowd. The crowd coordinator may be configured to aggregate identifications of task operations, task acceptance criteria, and/or device resource information for each of participating computing devices 100, 150, 200 and 300. The crowd coordinator may be configured to dynamically generate a temporary policy whereby task operations are assigned among participating computing devices 100, 150, 200 and 300. The crowd coordinator may be configured to implement the temporary policy by sending task management information to participating computing devices 100, 200, 300, and/or any other participating computing devices. The crowd coordinator may be configured to adaptively change and re-implement the temporary policy, e.g., in order to decrease overall energy consumption, over time, of each of participating computing devices 100, 150, 200 and 300, as well as to accommodate computing devices that may enter or leave the crowd.

In some embodiments, computing devices 100, 150, 200 and 300 may be configured to occasionally re-assign crowd coordinator task operations to a different computing device, e.g., to computing device 100, 200, and/or 300 so that crowd coordinator tasks may be shared among computing devices 100, 150, 200 and 300 in similar manner to other shared task operations. In some embodiments, computing devices 100, 150, 200 and 300 may be configured to retain a same computing device 150 as crowd coordinator, e.g., computing device 150 may be configured to volunteer to serve as a static crowd coordinator, or computing devices 100, 150, 200 and 300 may be configured to select a static crowd coordinator based on device power supply information.

In some embodiments, computing devices 100, 150, 200 and 300 may be configured to coordinate distribution of task operations among computing devices 100, 150, 200 and 300 using distributed crowd coordination. For example, task management communications 102, 202, 302A and 302B may each comprise identifications of task operations, task acceptance criteria, and/or device resource information for each of participating computing devices 100, 150, 200 and 300. Task acceptances 103, 203, 303A and 303B may each identify task operations accepted by any of participating computing devices 100, 150, 200 and 300. Task results 104, 204, 304A and 304B may be distributed among participating computing devices 100, 150, 200 and 300. Each of participating computing devices 100, 150, 200 and 300 may be configured to contribute to the crowd, e.g., by performing task operations, or by compensating those devices which perform task operations with electronic credits as described herein. Some embodiments may enforce contribution to the crowd, e.g., by requiring contribution as a condition for participation, e.g., subsequent to an initial participation period.

FIG. 3 illustrates four computing devices, however, techniques according to FIG. 3 may be applied in connection with two or more computing devices, and up to any number of computing devices. Also, FIG. 3 illustrates low-power wireless connections between some, but not all of the illustrated computing devices. In some embodiments all participating computing devices may establish low-power wireless connections with all other participating computing devices, for example, by including low-power wireless connections between computing devices 100 and 200, and between computing devices 150 and 300, in addition to the low-power wireless connections illustrated in FIG. 3. In some embodiments, low-power wireless connections may exist between one of the participating computing devices, e.g., a crowd coordinator such as computing device 150, and all other participating computing devices, e.g., computing devices 100, 200, and 300, while low-power wireless connections such as 325A and 325B need not be established.

Figure 4:
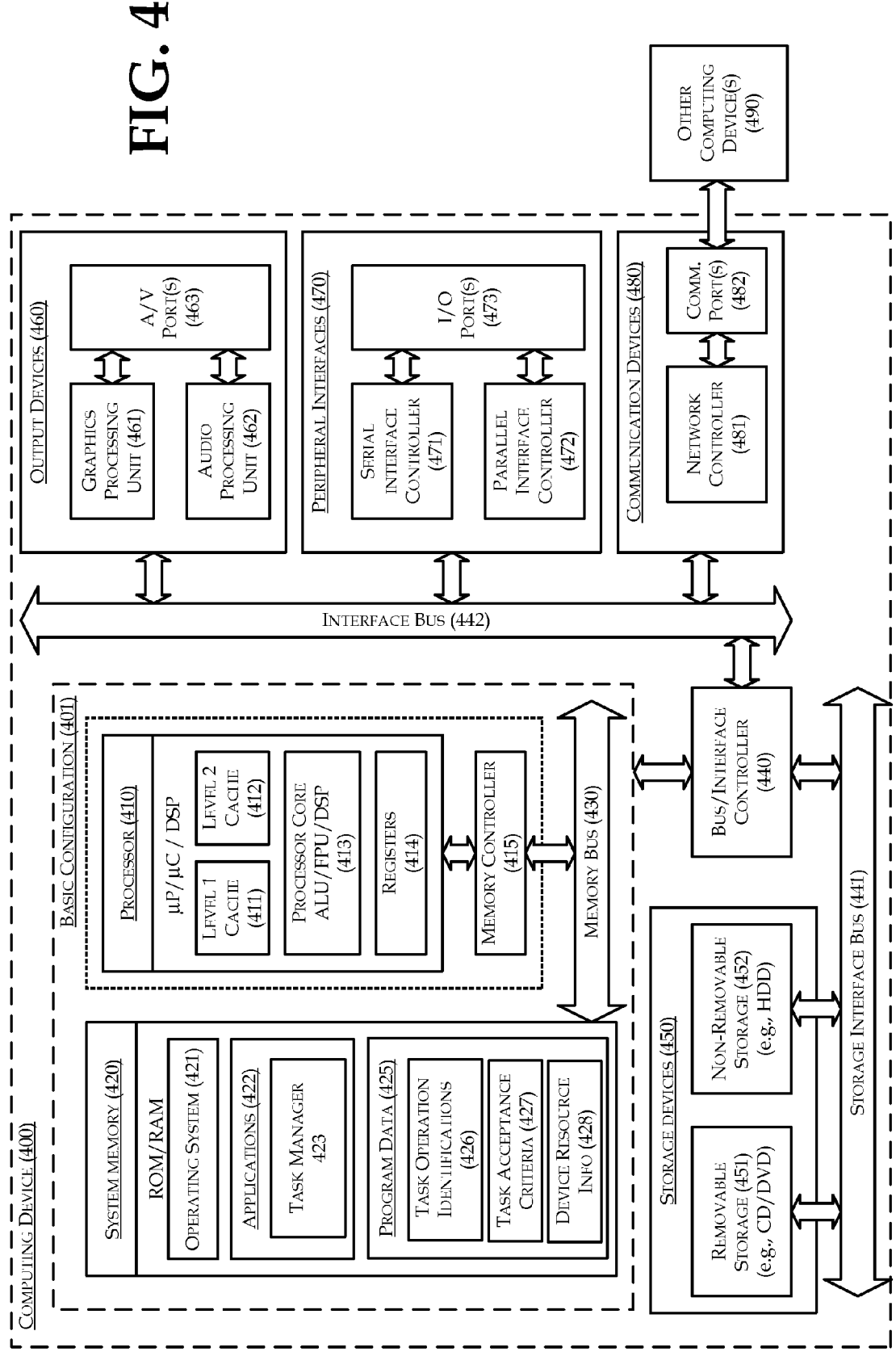
FIG. 4 is a block diagram of a computing device as one example of a device equipped for task management across low-power wireless connections.

FIG. 4 is a block diagram of a computing device 400 as one example of a device equipped for task management across low-power wireless connections, arranged in accordance with at least some embodiments of the present disclosure. Computing device 400 may for example serve as any of computing devices 100, 150, 200, and/or 300. In a very basic configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.), or any combination thereof. System memory 420 typically includes an operating system 421, one or more applications 422, and program data 425. In some embodiments, operating system 421 may comprise a virtual machine that is managed by a Virtual Machine Manager (VMM). Applications 422 may include, for example, task manager module(s) 423 to implement any of task managers 110A, 110B, 110C, and/or 110D. Program data 425 may include task operation identifications 426, task acceptance criteria 427, and device resource information 428 that may be used by task manager module(s) 423.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disc drives such as compact disc (CD) drives or digital versatile disc (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 411, level 2 cache 412, system memory 420, removable storage 451, and non-removable storage devices 452 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that may be used to store the desired information and that may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output devices 460 include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 473. Other conventional I/O devices may be connected as well such as a mouse, keyboard, and so forth. An example communications device 480 includes a network controller 481, which may be arranged to facilitate, e.g., low-power wireless communications with one or more other computing devices 490, such as any of computing devices 100, 150, 200, and/or 300, over a network communication via one or more communication ports 482. Computing device 400 may additionally comprise communications devices for high-power wireless communications and/or GPS communications as described herein.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 400 may be implemented as a mobile computing device, such as a smart phone, tablet, or laptop which is equipped to operate on battery power. Computing device 400 may also be implemented as a desktop or other computing device which may not have a battery, such as a device in a coffee shop, office, or other gathering place which may be adapted to manage task operations on behalf of mobile devices which come within range of low-power wireless communications. Computing device 400 may also be implemented as wireless accessory device such as an activity tracker device or other device which may, e.g., wirelessly communicate with a smart phone or other device.

Figure 5:
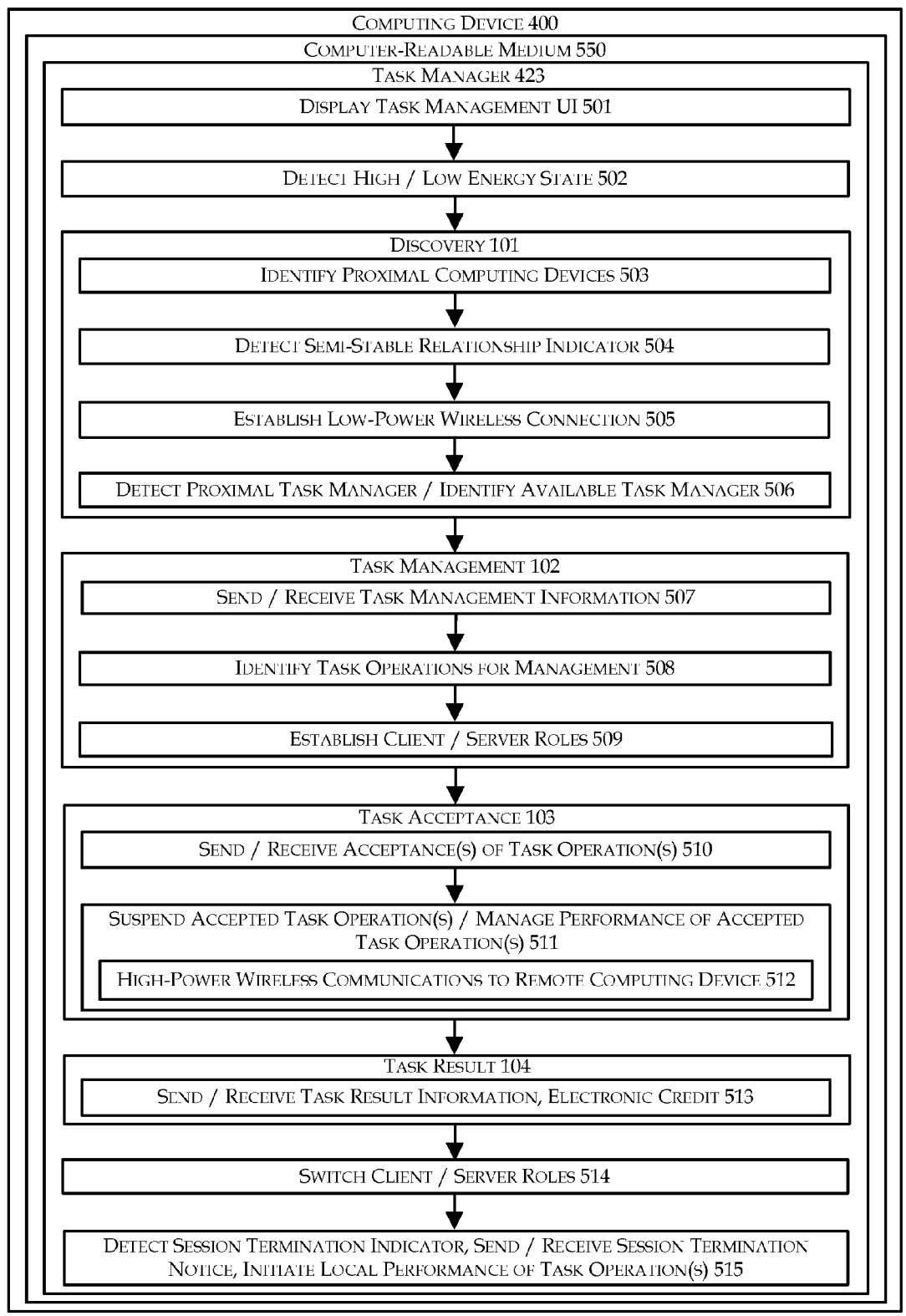
FIG. 5 is a flow diagram illustrating example methods configured to manage tasks across low-power wireless connections.

FIG. 5 is a flow diagram illustrating example methods configured to manage tasks across low-power wireless connections, arranged in accordance with at least some embodiments of the present disclosure. The example flow diagram may include one or more operations/modules as illustrated by blocks 501-515, which represent operations as may be performed in methods performed by task manager 423, functional modules in computing device 400, and/or instructions as may be recorded on a computer readable medium 550.

In FIG. 5, blocks 501-515 are illustrated as including blocks being performed sequentially, e.g., with block 501 first and block 515 last. Furthermore, blocks 503-513 are arranged within discovery 101, task management 102, task acceptance 103, and task result 104 blocks corresponding to like-identified operations described with reference to FIG. 1. It will be appreciated however that blocks 501-515 may be re-arranged as convenient, which may remove blocks 503-513 from blocks 101, 102, 103, or 104, to suit particular embodiments, and that blocks 501-515 or portions thereof may be performed concurrently in some embodiments. It will also be appreciated that in some examples various blocks may be eliminated, divided into additional blocks, and/or combined with other blocks.

FIG. 5 illustrates example methods by which computing device 400 may manage tasks across low-power wireless connections, including operations that may be performed in peer-to-peer arrangements, operations that may be performed in a client role, operations that may be performed in a server role, and operations that may be performed to coordinate tasks among multiple participating computing devices, e.g., in a crowd of participating devices such as illustrated in FIG. 3.

At a "Display Task Management UI" block 501, computing device 400 may display a task management UI adapted to receive task management user inputs. An example task management UI is illustrated in FIG. 6.

Figure 6:
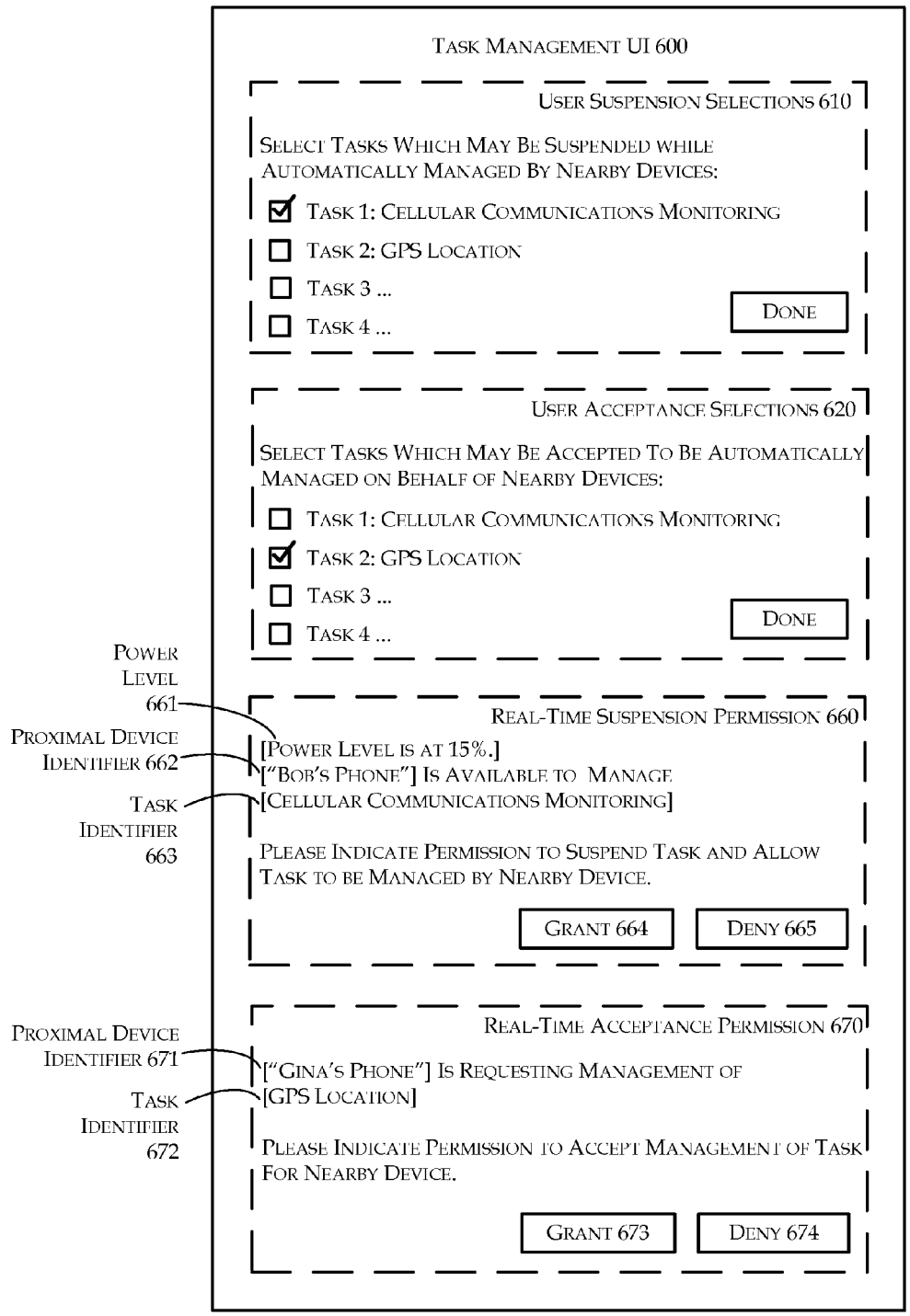
FIG. 6 is a block diagram illustrating an example task management UI, all arranged in accordance with at least some embodiments of the present disclosure.

FIG. 6 is a block diagram illustrating an example task management UI, arranged in accordance with at least some embodiments of the present disclosure. FIG. 6 includes a task management UI 600 which may be provided by computing device 400 equipped with task manager 423. Task management UI 600 may be adapted to receive task management user inputs, thereby allowing user control over tasks which may be suspended and tasks which may be accepted for management. Task management UI 600 may include, e.g., user suspension selections 610, user acceptance selections 620, real-time suspension permission 660, and/or real-time acceptance permission 670.

Task management UI 600 may comprise more or fewer elements than those illustrated in FIG. 6 in some embodiments. For example, task management UI 600 may comprise user suspension selections 610 and/or user acceptance selections 620, without real-time suspension permission 660 and/or real-time acceptance permission 670. Computing device 400 may display task management UI 600 prior to engaging in task management, e.g., when task manager 423 is installed at computing device 400. Computing device 400 may be adapted to display real-time suspension permission 660 and/or real-time acceptance permission 670 independently in real-time during task management, to receive task management user inputs in circumstances which may not be handled automatically according to previously established user suspension selections 610 and/or user acceptance selections 620.

User suspension selections 610 may be adapted to receive user selections of task operations which may be automatically identified by computing device 400 for task management via low-power wireless communications, to allow proximal computing devices to manage performance of selected task operations on behalf of the computing device 400. For example, a user may select and de-select task operations from a list of selectable task operations, as shown. Computing device 400 may save the user's selected task operations, e.g., in response to selection of the "Done" control. Computing device 400 may subsequently automatically identify the user-selected task operations for task management via low-power wireless communications, to allow proximal computing devices to manage performance of the user-selected task operations on behalf of the computing device 400. In this context, the term "automatically" refers to performing an operation without human involvement, e.g., identifying the user-selected task operations for task management via low-power wireless communications, without real-time suspension permission 660.

In some embodiments, computing device 400 may adapted to not identify task operations other than those selected in user suspension selections 610 for task management via low-power wireless communications. In some embodiments, computing device 400 may adapted to not automatically identify task operations other than those selected in user suspension selections 610 for task management via low-power wireless communications, however, computing device 400 may be adapted to request real-time suspension permissions, e.g., such as real-time suspension permission 660, to identify task operations other than those selected in user suspension selections 610.

User acceptance selections 620 may be adapted to receive user selections of task acceptance criteria for computing device 400, to allow computing device 400 to automatically manage task operations that match selected task acceptance criteria on behalf of proximal computing devices. For example, in embodiments wherein task acceptance criteria comprises identifications of task operations which may be accepted for management, a user may select and de-select task operations from a list of selectable task operations, to establish the selected task operations as acceptable for management by computing device 400, as shown in FIG. 6. Computing device 400 may save the user's selected task acceptance criteria, e.g., in response to selection of the "Done" control. Computing device 400 may subsequently automatically accept management, via low-power wireless communications, of task operations matching the user-selected task operations. In this context, the term "automatically" refers to performing an operation without human involvement, e.g., accepting management of a task operation without real-time acceptance permission 670.

In some embodiments, computing device 400 may adapted to not accept, for task management via low-power wireless communications, task operations other than those selected in user acceptance selections 620. In some embodiments, computing device 400 may adapted to not automatically accept task operations other than those selected in user acceptance selections 620, however, computing device 400 may be adapted to request real-time acceptance permissions, e.g., such as real-time acceptance permission 670, to accept task operations other than those selected in user acceptance selections 620.

Real-time suspension permission 660 may be adapted to receive real-time user permissions to allow computing device 400 to identify task operations for management across low-power wireless communications. In an example scenario, computing device 400 may be low on battery power, and computing device 400 may identify that a proximal device is available to manage one or more tasks on behalf of computing device 400. Computing device 400 may be adapted to display real-time suspension permission 660 to solicit user permission to suspend a task operation while such operation is managed by the proximal device.

In some embodiments, real-time suspension permission 660 may comprise a power level 661, e.g., an indication of remaining battery power at computing device 400. Power level 661 may assist the user in judging the urgency of suspending task operations. In some embodiments, real-time suspension permission 660 may comprise a proximal device identifier 662, e.g., to indicate an owner or other identifier of the proximal device. Proximal device identifier 662 may assist the user in judging the safety of allowing the proximal device to manage task operations. In some embodiments, real-time suspension permission 660 may comprise a task identifier 663, e.g., to indicate which task operation(s) may be suspended and managed via low-power wireless communications. Task identifier 663 may assist the user in judging the safety of allowing the proximal device to manage task operations. Real-time suspension permission 660 may comprise a grant 664 and a deny 665 control. Computing device 400 may be adapted to proceed to suspend a task operation identified by task identifier 663, and to allow management thereof via low-power wireless communications, in response to user selection of grant 664. Computing device 400 may be adapted to continue with local performance of the task operation identified by task identifier 663, and to not allow management thereof via low-power wireless communications, in response to user selection of deny 665.

In some embodiments, real-time acceptance permission 670 may comprise a proximal device identifier 671, e.g., to indicate an owner or other identifier of a proximal device for which a task operation may be managed. Proximal device identifier 671 may assist the user in judging the safety of allowing computing device 400 to manage task operations on behalf of the proximal device. In some embodiments, real-time suspension permission 660 may comprise a task identifier 672, e.g., to indicate which task operation(s) may accepted for management via low-power wireless communications. Task identifier 672 may assist the user in judging the safety and/or advisability of accepting management of task operations. Real-time acceptance permission 670 may comprise a grant 673 and a deny 674 control. Computing device 400 may be adapted to proceed to accept management of a task operation identified by task identifier 671, in response to user selection of grant 673. Computing device 400 may be adapted to not accept management of a task operation identified by task identifier 671 in response to user selection of deny 674.

Returning to block 501 in FIG. 5, computing device 400 may for example display task management UI 600 comprising user suspension selections 610 and user acceptance selections 620 at block 501. Computing device 400 may receive user task management selections via task management UI 600 at block 501. Computing device 400 may apply received task management selections at subsequent blocks, e.g., during task management 102. Computing device 400 may also optionally display real-time suspension permission 660 and/or real-time acceptance permission 670 at subsequent blocks, e.g., during task management 102. Block 501 may be followed by block 502.

At a "Detect High/Low Energy State" block 502, computing device 400 may optionally detect its energy state, such as remaining battery power at computing device 400 and/or whether computing device 400 is connected to an external source of power, in advance of engaging in task management via low-power wireless communications. In some embodiments, computing device 400 may detect a low energy state a computing device 400 power supply, and computing device 400 may engage in task management operations according to blocks 503-515 in a client role responsive to the detected low energy state. In some embodiments, computing device 400 may detect a high energy state at a computing device 400 power supply, or computing device 400 may detect that computing device 400 is connected to an external source of power, and computing device 400 may engage in task management operations according to blocks 503-515 in a server role responsive to the detected high energy state. For example, computing device 400 may identify at block 506, responsive to the detected high energy state at block 502, that task manager 423 at computing device 400 is available to proximal computing devices in a server role. Block 502 may be followed by block 503.

At an "Identify Proximal Computing Devices" block 503, computing device 400 may identify one or more proximal computing devices in range of low-power wireless communications from computing device 400. For example, computing device 400 may identify proximal computing devices in range of Wi-Fi or Bluetooth communications. Block 503 may be followed by block 504.

At a "Detect Semi-Stable Relationship Indicator" block 504, computing device 400 may optionally detect semi-stable relationship indicators, indicating semi-stable relationships between computing device 400 proximal computing device(s) detected at block 503. Semi-stable relationship indicators may comprise any indicators that low-power wireless communications between computing device 400 and a proximal computing device may last for at least a predetermined minimum time period, such as at least one minute or other predetermined minimum time period. For example, semi-stable relationship indicators may comprise indicators that computing device 400 and proximal computing device(s) are not moving relative to one another. Block 504 may be followed by block 505.

At an "Establish Low-Power Wireless Connection" block 505, computing device 400 may exchange information as appropriate with proximal computing device(s) detected at block 503 to begin communicating with the proximal computing device(s) via a low-power wireless connection(s). In some embodiments, computing device 400 may establish low-power wireless connection(s) with devices for which semi-stable relationship indicators are detected at block 504. Operations at block 505 may depend on the wireless communications technology, e.g., whether Wi-Fi or Bluetooth communications are used. Block 505 may be followed by block 506.

At a "Detect Proximal Task Manager/Identify Available Task Manager" block 506, computing device 400 may detect proximal task manager(s) at proximal computing device(s) for which low-power wireless connection(s) are established at block 505, and/or identify, to proximal computing device(s) for which low-power wireless connection(s) are established at block 505, available task manager 423 at computing device 400. In peer-to-peer arrangements, block 506 may comprise exchanging task manager information between computing device 400 and proximal computing device(s), so that computing device 400 and proximal computing device(s) may identify which computing devices are equipped with task managers and are therefore able to engage in task management across low-power wireless connection(s).

In a client role, computing device 400 may detect, at block 506, proximal task manager(s) at proximal computing device(s), wherein the proximal task manager(s) are adapted to manage performance of task operations on behalf of computing devices. In some embodiments, computing device 400 may for example send a task manager information request to a proximal computing device, and the proximal computing device may send a responsive communication indicating that the proximal computing device is equipped with a task manager. In some embodiments, computing device 400 may receive task manager information broadcasted by proximal computing device(s).

In a server role, computing device 400 may identify, at block 506, via low-power wireless communications, available task manager 423 at computing device 400, wherein available task manager 423 is available to manage task operations for proximal computing devices. Computing device 400 may for example respond to a task manager information request from a proximal computing device in a client role, or computing device 400 may broadcast task manager information via low-power wireless communications to any proximal devices. Block 506 may be followed by block 507.

At a "Send/Receive Task Management Information" block 507, computing device 400 may exchange task management information with proximal computing device(s) comprising task managers, as identified at block 506. Task management information exchanged at block 507 may comprise, e.g., task acceptance criteria, identifications of task operations, and/or device resource information such as power supply information for computing device 400 and for proximal computing device(s) comprising task managers as identified at block 506.

In peer-to-peer arrangements, computing device 400 may send as well as receive task management information at block 507. For example, computing device 400 may send task management information for computing device 400 to proximal computing device(s), or to a proximal crowd coordinator device. Computing device 400 may optionally also receive task management information from proximal computing device(s).

In a client role, computing device 400 may send, at block 507, task management information to proximal computing device(s). Computing device 400 may send at least identification(s) of task operation(s) for which management via low-power wireless communications may produce energy savings for computing device 400. Computing device 400 may for example include task operation(s) associated with an energy consumption, when performed locally at computing device 400, which exceeds an energy consumption associated with low-power wireless communications with a proximal computing device comprising a task manager as identified at block 506. In a server role, computing device 400 may receive identification(s) of task operation(s) from a proximal computing device comprising a task manager as identified at block 506.

In some embodiments, task management information exchanged at block 507 may comprise task acceptance criteria and/or device resource information, in addition identification(s) of task operation(s). For example, computing device 400 may exchange identification(s) of task operation(s), task acceptance criteria and device resource information with proximal computing device(s) comprising task managers as identified at block 506. Computing device 400 and the proximal computing device(s) may allocate identified task operation(s) for management by computing device 400 and the proximal computing device(s), based on the exchanged task acceptance criteria and device resource information.

In some embodiments, computing device 400 may comprise stored task management information for use at block 507. For example, task management information received via task management UI 600 may be stored and used at block 507. Computing device 400 may also identify and store device resource information for use at block 507 in advance of methods according to FIG. 5. In some embodiments, computing device 400 may dynamically identify task management information for use at block 507. For example, computing device 400 may dynamically identify tasks currently being performed by computing device 400, and computing device 400 may include identifiers for such dynamically identified tasks in task management information exchanged at block 507. Computing device 400 may dynamically identify power supply information, such as remaining battery life at computing device 400, and computing device 400 may include such dynamically identified device resource information in task management information exchanged at block 507. Block 507 may be followed by block 508.

At an "Identify Task Operations for Management" block 508, computing device 400 may match identified task operations with task acceptance criteria. For example, in a client role, computing device 400 may match identified task operations for computing device 400 with task acceptance criteria and/or device resource information received from proximal computing device(s). In a server role, computing device 400 may match identifications of task operations received from proximal computing device(s) with task acceptance criteria and/or device resource information for computing device 400. In peer-to-peer arrangements computing device 400 may match identifications of task operations with task acceptance criteria for multiple computing devices, including, e.g. computing device 400 and proximal computing device(s). Computing device 400 may allocate identified task operations among the multiple proximal computing devices, e.g., to reduce redundant task operations of the multiple proximal computing devices. Block 508 may be followed by block 509.

At an "Establish Client/Server Roles" block 509, computing device 400 may establish client and/or server roles for computing device 400 and/or proximal computing devices with which task management information was exchanged at block 507. For example, in peer-to-peer arrangements, when computing device 400 serves as crowd coordinator, computing device 400 may notify proximal computing device(s) of allocations of identified task operations made at block 508. Proximal computing device(s) may take server roles for task operations allocated to them, while proximal computing device(s) may take client roles for task operations not allocated to them. In peer-to-peer arrangements without a crowd coordinator, computing device 400 may determine, from task management information exchanged at block 507, whether computing device 400 may enter a server role for any identified task operations.

In some embodiments, computing device 400 may establish itself in a client role based on task management information exchanged at block 507. For example, computing device 400 may determine from exchanged task management information that a power supply at computing device 400 has less available power than a proximal computing device power supply. In response to such a determination, computing device 400 may establish itself in a client role with respect to the proximal computing device. Computing device 400 may optionally notify the proximal computing device that computing device 400 may take the client role while the proximal computing device may take the server role. Conversely, computing device 400 may determine from exchanged task management information that a proximal computing device power supply has less available power than a power supply at computing device 400. In response to such a determination, computing device 400 may establish itself in a server role with respect to the proximal computing device. Computing device 400 may optionally notify the proximal computing device that computing device 400 may take the server role while the proximal computing device may take the client role. In some embodiments, computing device 400 may use task acceptance criteria and/or device resource information other than power supply information to make client and server role determinations. Block 509 may be followed by block 510.

At a "Send/Receive Acceptance(s) of Task Operation(s)" block 510, computing device 400 may send, to proximal computing device(s) in client roles established at block 509, acceptances of any task operations for which computing device 400 is assigned a server role at block 509. Conversely, computing device 400 may receive from proximal computing device(s) in server roles established at block 509, acceptances of any task operations for which computing device 400 is assigned a client role at block 509. Block 510 may be followed by block 511.

At a "Suspend Accepted Task Operation(s)/Manage Performance of Accepted Task Operation(s)" block 511, computing device 400 may either suspend or manage an accepted task operation, depending on whether computing device 400 is in a client or server role for the accepted task operation. In a client role, computing device 400 may suspend task operation(s) accepted at block 511, in response to the acceptance received at block 511. In a server role, computing device 400 may manage performance of task operation(s) accepted by computing device 400. Managing performance of task operation(s) may comprise performing the task operation(s) locally at computing device 400, or identifying a proximal secondary computing device to perform the task operation(s), and relaying the task operation(s) to the proximal secondary computing device, e.g., as described with reference to FIG. 2. Block 511 may include block 512.

Task operations managed at block 511 may comprise any task operations. Task operations may comprise, e.g., high-power wireless communications with a cellular communications network, high-power wireless communication with a positioning system to calculate a location of computing device 400; relatively high energy consumption task operations relative to other task operations for computing device 400; future instances of task operations performed repeatedly by the computing device 400; and/or task operations performed, prior to identifying proximal computing devices at block 503, by both computing device 400 and proximal computing devices comprising task managers as may be identified at block 506.

At a "High Power Wireless Communications to Remote Computing Device" block 512, when a task operation which is suspended or managed at block 511 comprises high-power wireless communications with a remote computing device, computing device 400 may communicate with such remote computing device in connection with suspending or managing the task operation. For example, when computing device 400 is in a client role, computing device 400 may send a high-power wireless communication to a remote computing device, such as a cellular communications network base station, to enable the remote computing device to interact with a proximal computing device, e.g., a proximal computing device in a server role. Conversely, when computing device 400 is in a server role, computing device 400 may communicate via high-power wireless communications with a remote computing device, such as a cellular communications network base station, in connection with managing a task operation at block 511. Blocks 511 and 512 may be followed by block 513.

At a "Send/Receive Task Result Information, Electronic Credit" block 513, computing device 400 may exchange task result information and/or electronic credits with proximal device(s) which suspend or manage task operations at block 511. In a server role, computing device 400 may send, to proximal computing devices in client roles, task result information produced from performance of task operation(s) under management of computing device 400. In a client role, computing device 400 may receive task result information produced from performance of the task operations under management of proximal computing device(s) in server roles.

In embodiments wherein electronic credits are exchanged, in a client role, computing device 400 may send electronic credits to proximal computing device(s) in server roles to compensate the proximal computing device(s) for managing performance of the task operations. In a server role, computing device 400 may receive electronic credits to compensate computing device 400 for managing performance of task operations.

In some embodiments, computing device 400 may serve as a crowd coordinator device. Computing device 400 may for example coordinate distribution of task result information among multiple proximal computing devices. Computing device 400 may receive task result information from proximal computing devices to which computing device 400 allocated task operations at block 509. Computing device 400 may send received task result information for each task operation to those proximal computing devices which are in client roles for each respective task operation. In some embodiments, computing device 400 may broadcast received task result information for use by any proximal computing devices. Block 513 may be followed by block 514.

At a "Switch Client/Server Roles" block 514, computing device 400 may switch from a client role to a server role, or vice versa. In a client role, computing device 400 may switch from the client role with respect to a proximal computing device, to a server role with respect to the proximal computing device. In a server role, computing device 400 may switch from the server role with respect to a proximal computing device, to a client role with respect to the proximal computing device. In an example two-device scenario, computing device 400 may for example alternate between client and server roles, while a proximal device oppositely alternates between server and client roles. In an example multiple device scenario, computing device 400 may for example accept a server role with respect to multiple proximal devices, and may subsequently switch to a client role while one or more of the multiple proximal devices accept the server role. In scenarios involving multiple task operations, multiple proximal devices may cooperate by re-assigning client and server roles over time to reduce overall load on the multiple proximal devices while optionally also fairly distributing overall load and/or electronic credits among the multiple proximal devices. Computing device 400 may return to previous blocks of FIG. 5, as appropriate, in order to switch between client and server roles. Block 514 may be followed by block 515.

At a "Detect Session Termination Indicator, Send/Receive Termination Notice, Initiate Local Performance of Task Operation(s)" block 515, computing device 400 may detect a session termination indicator, and may send or receive a session termination notice. Session termination indicators may comprise any indicators that low-power wireless communications between computing device 400 and a proximal computing device may be terminated. For example, session termination indicators may comprise indicators that computing device 400 and a proximal computing device are moving relative to one another. Relative movement may be detected, e.g., by monitoring changes in wireless signal strength associated with low-power wireless communications. As a result of relative movement, computing device 400 and a proximal computing device may be leaving proximity and low-power wireless communications may become impossible. In some embodiments, session termination indicators may comprise session termination notices received from proximal computing devices.

In response to detecting a session termination indicator, computing device 400 may deliver session termination notice(s) to proximal computing devices in client and/or server roles with respect to computing device 400. Session termination notice(s) may comprise an indication that computing device 400 will terminate task management interactions with proximal computing devices. In a server role, computing device 400 may send, in addition to session termination notice(s), any final task result information to proximal computing device(s) in client roles with respect to computing device 400. In a client role, computing device 400 may receive final task result information from proximal computing devices, and computing device 400 may initiate local performance, at computing device 400, of any task operations suspended at block 511.

To summarize client role operations according to FIG. 5, as well as various operations as may be performed in peer-to-peer arrangements, computing device 400, e.g., a mobile computing device, may perform a method to manage tasks across low-power wireless communications, comprising: identifying, by computing device 400, one or more proximal computing devices in range of low-power wireless communications from computing device 400; detecting, by computing device 400, a proximal task manager at at least one of the proximal computing devices, wherein the proximal task manager is adapted to manage performance of task operations on behalf of computing devices; sending, by computing device 400, via low-power wireless communications with the at least one proximal computing device, an identification of one or more task operations, wherein the one or more task operations are associated with an energy consumption that exceeds an energy consumption associated with low-power wireless communications with the at least one proximal computing device; receiving, by computing device 400, via low-power wireless communications with the at least one proximal computing device, an acceptance of the one or more task operations; suspending, by computing device 400, the one or more task operations in response to the acceptance of the one or more task operations; and receiving, by computing device 400, via low-power wireless communications with the at least one proximal computing device, task result information produced from performance of the one or more task operations under management of the at least one proximal computing device.

In some embodiments, computing device 400 may display a task management UI adapted to receive task management user inputs, the task management user inputs comprising one or more of: user selections of task operations which may be automatically identified by computing device 400 via low-power wireless communications, to allow proximal computing devices to manage performance of selected task operations on behalf of computing device 400; user selections of task acceptance criteria for computing device 400, to allow computing device 400 to automatically manage task operations that match selected task acceptance criteria on behalf of proximal computing devices; and/or real-time user permissions to allow computing device 400 to identify or accept task operations for management across low-power wireless communications.

In some embodiments, computing device 400 may detect a semi-stable relationship indicator indicating a semi-stable relationship between computing device 400 and the at least one proximal computing device, prior to sending the identification of one or more task operations. In some embodiments, computing device 400 may detect a low energy state at a computing device 400 power supply, and computing device 400 may perform operations of FIG. 5 responsive to the detected low energy state. In some embodiments, computing device 400 may send a high-power wireless communication to a remote computing device to enable the remote computing device to interact with the at least one proximal computing device in connection with the one or more task operations.

In some embodiments, computing device 400 may exchange, via low-power wireless communications with the at least one proximal computing device, task management information with the at least one proximal computing device, the task management information comprising task acceptance criteria, identifications of task operations, and power supply information for both computing device 400 and the at least one proximal computing device; computing device 400 may determine that a computing device 400 power supply has less available power than an at least one proximal computing device power supply; computing device 400 may match the one or more task operations with task acceptance criteria from the at least one proximal computing device; and computing device 400 may establish a role as client computing device with respect to the at least one proximal computing device, in response to determining that computing device 400 power supply has less available power and in response to matching the one or more task operations with task acceptance criteria from the at least one proximal computing device. In some embodiments, computing device 400 may switch from the role as client computing device with respect to the at least one proximal computing device, to a role as server computing device with respect to the at least one proximal computing device, wherein in the role as server computing device, computing device 400 manages performance of task operations on behalf of the at least one proximal computing device.

In some embodiments, computing device 400 may send, via low-power wireless communications with the at least one proximal computing device, an electronic credit to compensate the at least one proximal computing device for managing performance of the one or more task operations. In some embodiments, computing device 400 may detect a session termination indicator, and in response to detecting the session termination indicator, computing device 400 may deliver, via low-power wireless communications with the at least one proximal computing device, a session termination notice; and computing device 400 may initiate performance of the one or more task operations at computing device 400.

To summarize server role operations according to FIG. 5, as well as various operations as may be performed in peer-to-peer arrangements, computing device 400, e.g., a mobile computing device, a desktop-type computing device, or other computing device, may perform a method to manage tasks across low-power wireless communications, comprising: identifying, by computing device 400, to one or more proximal computing devices, via low-power wireless communications, available task manager 423 at computing device 400, wherein available task manager 423 is adapted to manage performance of task operations on behalf of the one or more proximal computing devices; receiving, by computing device 400, via low-power wireless communications with at least one proximal mobile computing device, an identification of one or more task operations, wherein the one or more task operations are associated with an energy consumption that exceeds an energy consumption associated with low-power wireless communications with the at least one proximal mobile computing device; sending, by computing device 400, via low-power wireless communications with the at least one proximal mobile computing device, an acceptance of the one or more task operations; managing, by computing device 400, performance of the one or more task operations; and sending, by computing device 400, via low-power wireless communications with the at least one proximal mobile computing device, task result information produced from performance of the one or more task operations under management of computing device 400.

In some embodiments, computing device 400 may display a task management UI as described herein, namely, a task management UI adapted to receive task management user inputs, the task management user inputs comprising one or more of: user selections of task operations which may be automatically identified by computing device 400 via low-power wireless communications, to allow proximal computing devices to manage performance of selected task operations on behalf of computing device 400; user selections of task acceptance criteria for computing device 400, to allow computing device 400 to automatically manage task operations that match selected task acceptance criteria on behalf of proximal computing devices; and/or real-time user permissions to allow computing device 400 to identify or accept task operations for management across low-power wireless communications.

In some embodiments, computing device 400 may detect a semi-stable relationship indicator indicating a semi-stable relationship between computing device 400 and the at least one proximal computing device, prior to receiving the identification of one or more task operations. In some embodiments, computing device 400 may detect a high energy state at a computing device 400 power supply, and computing device 400 may perform operations of FIG. 5 responsive to the detected high energy state. In some embodiments, computing device 400 may send a high-power wireless communication to a remote computing device in connection with managing the one or more task operations by computing device 400.

In some embodiments, managing performance of the one or more task operations by computing device 400 may comprise identifying, by computing device 400, a proximal secondary computing device to perform the one or more task operations, wherein the proximal secondary computing device is in range of low-power wireless communications from computing device 400. In some embodiments, computing device 400 may receive task management information from a plurality of proximal computing devices in range of low-power wireless communications from computing device 400, the task management information comprising task acceptance criteria, identifications of task operations, and/or power supply information for each of the plurality of proximal computing devices; computing device 400 may allocate task operations for the plurality of proximal computing devices among the plurality of proximal computing devices, wherein allocating reduces redundant task operations of the plurality of proximal computing devices; and computing device 400 may coordinate distribution of task result information among the plurality of proximal computing devices.

In some embodiments, computing device 400 may exchange, via low-power wireless communications with the at least one proximal mobile computing device, task management information with the at least one proximal mobile computing device, the task management information comprising task acceptance criteria, identifications of task operations, and power supply information for both computing device 400 and the at least one proximal mobile computing device; computing device 400 may determine that a proximal mobile computing device power supply has less available power than computing device 400 power supply; computing device 400 may match the one or more task operations with task acceptance criteria for computing device 400; and computing device 400 may establish a role as server computing device with respect to the at least one proximal mobile computing device, in response to determining that the proximal mobile computing device power supply has less available power and in response to matching the one or more task operations with task acceptance criteria for computing device 400. In some embodiments, computing device 400 may switch from the role as server computing device with respect to the at least one proximal mobile computing device, to a role as client computing device with respect to the at least one proximal mobile computing device, wherein in the role as client computing device, computing device 400 identifies task operations for management by the proximal mobile computing device.

In some embodiments, computing device 400 may receive, via low-power wireless communications with the at least one proximal mobile computing device, an electronic credit to compensate computing device 400 for managing performance of the one or more task operations. In some embodiments, computing device 400 may detect a session termination indicator, and in response to detecting the session termination indicator, computing device 400 may deliver, via low-power wireless communications with the at least one proximal mobile computing device, a session termination notice.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disc (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A mobile computing device adapted to manage tasks across low-power wireless communications, the mobile computing device comprising:
    a processor;
    a memory; and
    a task manager stored in the memory and executable by the processor, wherein the task manager is configured to:
        identify one or more proximal computing devices in range of low-power wireless communications from the mobile computing device;
        detect a proximal task manager at at least one of the proximal computing devices, wherein the proximal task manager is adapted to manage performance of task operations on behalf of computing devices;
        exchange, via low-power wireless communications with the at least one proximal computing device, task management information with the at least one proximal computing device, the task management information comprising:
            identifications of task operations at the mobile computing device;
            identifications of task operations at the at least one proximal computing device;
            power supply information of the mobile computing device; and
            power supply information of the at least one proximal computing device;
        in response to determination, from exchanged power supply information, that a power supply of the mobile computing device has less available power than a power supply of the at least one proximal computing device, establish a mobile computing device role as a client computing device with respect to the at least one proximal computing device, wherein in the role as a client computing device, the mobile computing device is configured to:
            send, via low-power wireless communications with the at least one proximal computing device, an identification of one or more task operations, wherein the one or more task operations are associated with an energy consumption that exceeds an energy consumption associated with low-power wireless communications with the at least one proximal computing device;
            receive, via low-power wireless communications with the at least one proximal computing device, an acceptance of the one or more task operations;
            suspend the one or more task operations in response to the acceptance of the one or more task operations; and
            receive, via low-power wireless communications with the at least one proximal computing device, task result information produced from performance of the one or more task operations under management of the at least one proximal computing device; and
        in response to determination, from exchanged power supply information, that the power supply of the mobile computing device has more available power than the power supply of the at least one proximal computing device, establish a mobile computing device role as a server computing device with respect to the at least one proximal computing device, wherein in the role as a server computing device, the mobile computing device manages performance of task operations on behalf of the at least one proximal computing device.

2. The mobile computing device of claim 1, wherein the task manager is configured to send a high-power wireless communication to a remote computing device to enable the remote computing device to interact with the at least one proximal computing device in connection with the one or more task operations.

3. The mobile computing device of claim 1, wherein the one or more task operations comprise
    a task operation performed, prior to identifying the one or more proximal computing devices in range of low-power wireless communications from the mobile computing device, by both the mobile computing device and the at least one proximal computing device.

4. The mobile computing device of claim 1, wherein the task management information further comprises task acceptance criteria at the mobile computing device and task acceptance criteria at the at least one proximal computing device, and wherein the task manager is configured to:
    match the identifications of task operations at the mobile computing device with the task acceptance criteria at the at least one proximal computing device; or
    match the identifications of task operations at the at least one proximal computing device with the task acceptance criteria at the mobile computing device.

5. The mobile computing device of claim 1, wherein the task manager is configured to switch the mobile computing device from the mobile computing device role as client computing device with respect to the at least one proximal computing device, to the mobile computing device role as server computing device with respect to the at least one proximal computing device.

6. The mobile computing device of claim 1, wherein the low-power wireless communications comprise Wi-Fi or Bluetooth communications.

7. The mobile computing device of claim 1, wherein the task manager is configured to detect a low energy state at a mobile computing device power supply, and to perform the operations of claim 1 responsive to the detected low energy state.

8. The mobile computing device of claim 1, wherein the task manager is configured to display a task management user interface adapted to receive task management user inputs, the task management user inputs comprising one or more of:

user selections of task operations which may be automatically identified by the mobile computing device via low-power wireless communications, to allow proximal computing devices to manage performance of selected task operations on behalf of the mobile computing device;

user selections of task acceptance criteria for the mobile computing device, to allow the mobile computing device to automatically manage task operations that match selected task acceptance criteria on behalf of proximal computing devices; or real-time user permissions to allow the mobile computing device to identify or accept task operations for management across low-power wireless communications.

9. The mobile computing device of claim 1, wherein the task manager is configured to display, in response to the acceptance of the one or more task operations, a notification that task-related user signaling will be suspended at the mobile computing device and that task-related user signaling will instead be performed at the at least one proximal computing device.

10. The mobile computing device of claim 1, wherein the task manager is configured to send, via low-power wireless communications with the at least one proximal computing device, an electronic credit to compensate the at least one proximal computing device for managing performance of the one or more task operations.

11. The mobile computing device of claim 1, wherein the task manager is configured to detect accelerometer information indicating a semi-stable relationship between the mobile computing device and the at least one proximal computing device, prior to exchanging the task management information with the at least one proximal computing device.

12. The mobile computing device of claim 1, wherein:
the task manager is configured to detect a session termination indicator;
the session termination indicator comprises one or more of:
signal strength information indicating changing signal strength associated with low-power wireless communications with the at least one proximal computing device;
accelerometer information; or
power supply information; and
in response to detection of the session termination indicator, the task manager is configured to:
deliver, via low-power wireless communications with the at least one proximal computing device, a session termination notice; and
initiate performance of the one or more task operations at the mobile computing device.

13. The mobile computing device of claim 1, wherein the one or more task operations comprise a high-power wireless communication with a positioning system to calculate a location of the mobile computing device.

14. The mobile computing device of claim 1, wherein the one or more task operations comprise one or more future instances of a task operation performed repeatedly by the mobile computing device.

15. A non-transitory computer readable storage medium having computer executable instructions executable by a processor for a mobile computing device, the instructions that, when executed by the processor, cause the processor to:
identify one or more proximal computing devices in range of low-power wireless communications from the mobile computing device;
detect a proximal task manager at at least one of the proximal computing devices, wherein the proximal task manager is adapted to manage performance of task operations on behalf of computing devices;
exchange, via low-power wireless communications with the at least one proximal computing device, task management information with the at least one proximal computing device, the task management information comprising:
identifications of task operations at the mobile computing device;
identifications of task operations at the at least one proximal computing device;
power supply information of the mobile computing device; and
power supply information of the at least one proximal computing device;
in response to determination, from exchanged power supply information, that a power supply of the mobile computing device has less available power than a power supply of the at least one proximal computing device, establish a mobile computing device role as a client computing device with respect to the at least one proximal computing device, wherein in the role as a client computing device, the mobile computing device is configured to:
send, via low-power wireless communications with the at least one proximal computing device, an identification of one or more task operations, wherein the one or more task operations are associated with an energy consumption that exceeds an energy consumption associated with low-power wireless communications with the at least one proximal computing device;
receive, via low-power wireless communications with the at least one proximal computing device, an acceptance of the one or more task operations;
suspend the one or more task operations in response to the acceptance of the one or more task operations; and
receive, via low-power wireless communications with the at least one proximal computing device, task result information produced from performance of the one or more task operations under management of the at least one proximal computing device; and
in response to determination, from exchanged power supply information, that the power supply of the mobile computing device has more available power than the power supply of the at least one proximal computing device, establish a mobile computing device role as a server computing device with respect to the at least one proximal computing device, wherein in the role as a server computing device, the mobile computing device manages performance of task operations on behalf of the at least one proximal computing device.

16. The non-transitory computer readable storage medium of claim 15, further comprising instructions that cause the processor to send a high-power wireless communication to a remote computing device to enable the remote computing device to interact with the at least one proximal computing device in connection with the one or more task operations.

17. The non-transitory computer readable storage medium of claim 15, wherein the one or more task operations comprise a task operation performed, prior to identifying the one or more proximal computing devices in range of low-power wireless communications from the mobile computing device, by both the mobile computing device and the at least one proximal computing device.

18. The non-transitory computer readable storage medium of claim 15, wherein the task management information further comprises task acceptance criteria at the mobile computing device and task acceptance criteria at the at least one proximal computing device, and further comprising instructions that cause the processor to:
  match the identifications of task operations at the mobile computing device with the task acceptance criteria at the at least one proximal computing device; or
  match the identifications of task operations at the at least one proximal computing device with the task acceptance criteria at the mobile computing device.

19. The non-transitory computer readable storage medium of claim 15, further comprising instructions that cause the processor to switch the mobile computing device from the mobile computing device role as client computing device with respect to the at least one proximal computing device, to the mobile computing device role as server computing device with respect to the at least one proximal computing device.

20. The non-transitory computer readable storage medium of claim 15, wherein the low-power wireless communications comprise Wi-Fi or Bluetooth communications.

21. The non-transitory computer readable storage medium of claim 15, further comprising instructions that cause the processor to detect a low energy state at a mobile computing device power supply, and to perform the operations of claim 15 responsive to the detected low energy state.

22. The non-transitory computer readable storage medium of claim 15, further comprising instructions that cause the processor to display a task management user interface adapted to receive task management user inputs, the task management user inputs comprising one or more of:
  user selections of task operations which may be automatically identified by the mobile computing device via low-power wireless communications, to allow proximal computing devices to manage performance of selected task operations on behalf of the mobile computing device;
  user selections of task acceptance criteria for the mobile computing device, to allow the mobile computing device to automatically manage task operations that match selected task acceptance criteria on behalf of proximal computing devices; or
  real-time user permissions to allow the mobile computing device to identify or accept task operations for management across low-power wireless communications.

23. The non-transitory computer readable storage medium of claim 15, further comprising instructions that cause the processor to display, in response to the acceptance of the one or more task operations, a notification that task-related user signaling will be suspended at the mobile computing device and that task-related user signaling will instead be performed at the at least one proximal computing device.

24. The non-transitory computer readable storage medium of claim 15, further comprising instructions that cause the processor to send, via low-power wireless communications with the at least one proximal computing device, an electronic credit to compensate the at least one proximal computing device for managing performance of the one or more task operations.

25. The non-transitory computer readable storage medium of claim 15, further comprising instructions that cause the processor to detect accelerometer information indicating a semi-stable relationship between the mobile computing device and the at least one proximal computing device, prior to performing the instructions to exchange the task management information with the at least one proximal computing device.

26. A method to manage tasks across low-power wireless communications, comprising:
  identifying, by a mobile computing device, one or more proximal computing devices in range of low-power wireless communications from the mobile computing device;
  detecting, by the mobile computing device, a proximal task manager at at least one of the proximal computing devices, wherein the proximal task manager is adapted to manage performance of task operations on behalf of computing devices;
  exchanging, by the mobile computing device, via low-power wireless communications with the at least one proximal computing device, task management information with the at least one proximal computing device, the task management information comprising:
    identifications of task operations at the mobile computing device;
    identifications of task operations at the at least one proximal computing device;
    power supply information of the mobile computing device; and
    power supply information of the at least one proximal computing device;
  in response to determination, from exchanged power supply information, that a power supply of the mobile computing device has less available power than an a power supply of the at least one proximal computing device, establishing a mobile computing device role as a client computing device with respect to the at least one proximal computing device, wherein in the role as a client computing device, the mobile computing device is configured to:
    send, via low-power wireless communications with the at least one proximal computing device, an identification of one or more task operations, wherein the one or more task operations are associated with an energy consumption that exceeds an energy consumption associated with low-power wireless communications with the at least one proximal computing device;
    receive, via low-power wireless communications with the at least one proximal computing device, an acceptance of the one or more task operations;
    suspend, the one or more task operations in response to the acceptance of the one or more task operations; and
    receive, via low-power wireless communications with the at least one proximal computing device, task result information produced from performance of the one or more task operations under management of the at least one proximal computing device; and
  in response to determination, from exchanged power supply information, that the power supply of the mobile computing device has more available power than the power supply of the at least one proximal computing device, establishing, by the mobile computing device, a mobile computing device role as a server computing device with respect to the at least one proximal computing device, wherein in the role as a server computing device, the mobile computing device manages performance of task operations on behalf of the at least one proximal computing device.

* * * * *